US007861241B2

(12) United States Patent
Kumagai et al.

(10) Patent No.: US 7,861,241 B2
(45) Date of Patent: Dec. 28, 2010

(54) INSTALL APPARATUS, INSTALL METHOD, PROGRAM, AND STORAGE MEDIUM

(75) Inventors: Atsushi Kumagai, Yokohama (JP); Shigeyuki Miyazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1007 days.

(21) Appl. No.: 11/627,425

(22) Filed: Jan. 26, 2007

(65) Prior Publication Data

US 2007/0245344 A1   Oct. 18, 2007

(30) Foreign Application Priority Data

Feb. 9, 2006   (JP)   ............................... 2006-032919
Feb. 9, 2006   (JP)   ............................... 2006-032920

(51) Int. Cl.
*G06F 9/445* (2006.01)
(52) U.S. Cl. ..................... 717/174; 717/168; 717/175; 717/178
(58) Field of Classification Search .................. 717/174
See application file for complete search history.

(56) References Cited

U.S. PATENT DOCUMENTS

| | | | | | |
|---|---|---|---|---|---|
| 5,555,416 | A | * | 9/1996 | Owens et al. | 717/178 |
| 5,805,897 | A | * | 9/1998 | Glowny | 717/178 |
| 6,066,182 | A | * | 5/2000 | Wilde et al. | 717/175 |
| 6,167,567 | A | * | 12/2000 | Chiles et al. | 717/173 |
| 6,275,987 | B1 | * | 8/2001 | Fraley et al. | 717/127 |
| 6,301,708 | B1 | | 10/2001 | Gazdik et al. | |
| 6,591,418 | B2 | * | 7/2003 | Bryan et al. | 717/177 |
| 6,618,857 | B1 | * | 9/2003 | Marino et al. | 717/175 |
| 6,681,391 | B1 | * | 1/2004 | Marino et al. | 717/176 |
| 6,789,215 | B1 | * | 9/2004 | Rupp et al. | 714/38 |
| 6,854,112 | B2 | * | 2/2005 | Crespo et al. | 717/177 |
| 7,181,739 | B1 | * | 2/2007 | Harral et al. | 717/175 |
| 7,496,913 | B2 | * | 2/2009 | Hayes et al. | 717/174 |
| 7,546,597 | B2 | * | 6/2009 | Suzuki | 717/175 |
| 2002/0107945 | A1 | | 8/2002 | George et al. | |
| 2004/0194084 | A1 | | 9/2004 | Matsunami et al. | |

FOREIGN PATENT DOCUMENTS

| | | |
|---|---|---|
| CN | 1588313 A | 3/2005 |
| JP | 10-027090 | 1/1998 |
| JP | 03578135 | 7/2004 |
| WO | 00/77614 A | 12/2000 |

OTHER PUBLICATIONS

All of the above references were cited in a Apr. 28, 2009 European Search Report of the counterpart European Patent Application No. 07250441.8.
The above references were cited in a Jun. 6, 2008 Chinese Office Action issued in the counterpart Chinese Patent Application 200710002881, which is enclosed with an English translation.

* cited by examiner

*Primary Examiner*—Thomas K Pham
(74) *Attorney, Agent, or Firm*—Cowan, Liebowitz & Latman, P.C.

(57) ABSTRACT

An object of this invention is to obviate the need of updating a master installer even when one of a plurality of software programs to be installed is modified. An install method of installing, in a computer, a plurality of software programs each having an installation setting file describing process contents to install the software continuously, installs the plurality of software programs by continuously reading out the contents of the installation-setting files of the plurality of software programs.

5 Claims, 26 Drawing Sheets

FIG. 6

| FILE NAME | SORT KEY | SEQUENCE | PARENT |
|---|---|---|---|
| /AppFolder/SoftwareA/Install.ini | SoftA | 1 | 0 |
| /CompFolder/ComponentD/Install.ini | SoftA-CompD | 5 | 1 |
| /CompFolder/ComponentB/Install.ini | SoftA-CompB | 2 | 1 |
| /CompFolder/ComponentC/Install.ini | SoftA-CompC | 4 | 1 |
| /CompFolder/ComponentE/Install.ini | SoftA-CompB-CompE | 3 | 1 |

1001 — [General]
Type=NORMAL

1002 — [Sort]
Key="SoftA-CompD"

1003 — [Info]
Name="COMPONENT D" ~ 1007
Version="1.1" ~ 1008
Icon="Files.cab" "D.ico" ~ 1009
Description="IMAGE CONVERSION COMPONENT OF SOFTWARE A" ~ 1010
DiskSize=30 ~ 1011
Progress_Image="Files.cab" "D.bmp" ~ 1012

1004 — [Target]
DestinationFolder="/Program Files/ComponentD"

1005 — [Progress]
File_Unit=Size

1006 — [Files]
"ComponentDMain.dll"="Files.cab" "ComponentDMain.dll" 0
"../Shared Files/CompShare.lib"="Files.cab" "CompShare.lib" 0

| FILE NAME | SORT KEY | SEQUENCE | PARENT |
|---|---|---|---|
| /AppFolder/SoftwareA/Install.ini | SoftA | 1 | 0 |
| /AppFolder/SoftwareF/Install.ini | SoftF | 6 | 0 |
| /CompFolder/ComponentD/Install.ini | SoftA-CompD | 5 | 1 |
| /CompFolder/ComponentB/Install.ini | SoftA-CompB | 2 | 1 |
| /CompFolder/ComponentC/Install.ini | SoftA-CompC | 4 | 1 |
| /CompFolder/ComponentE/Install.ini | SoftA-CompB-CompE | 3 | 1 |
| /CompFolder/ComponentG/Install.ini | SoftF-CompG | 7 | 6 |
| /AutoAppFolder/SoftwareH/Install.ini | SoftH | 8 | 0 |

1201 — 1202 — 1203 — 1204

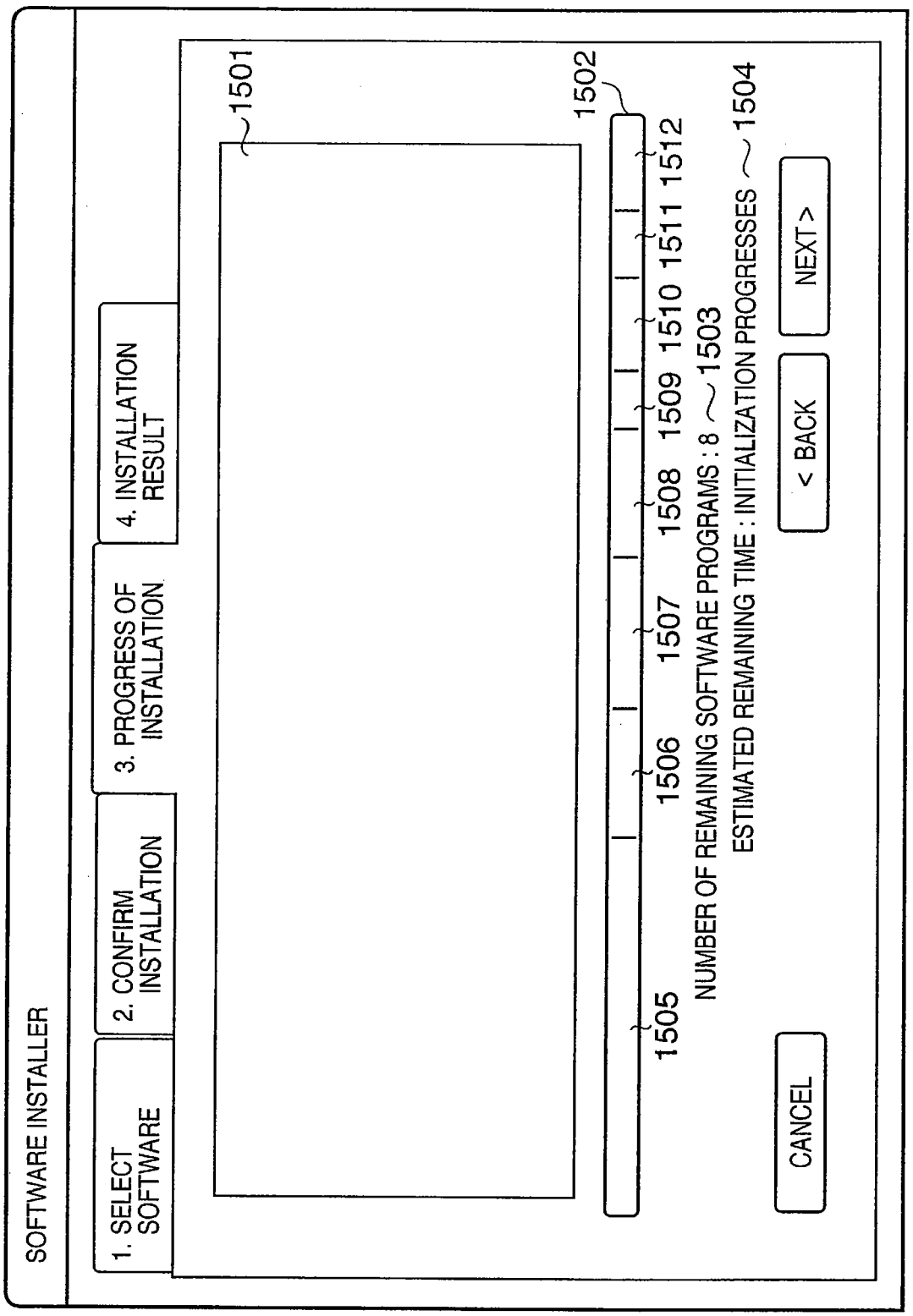

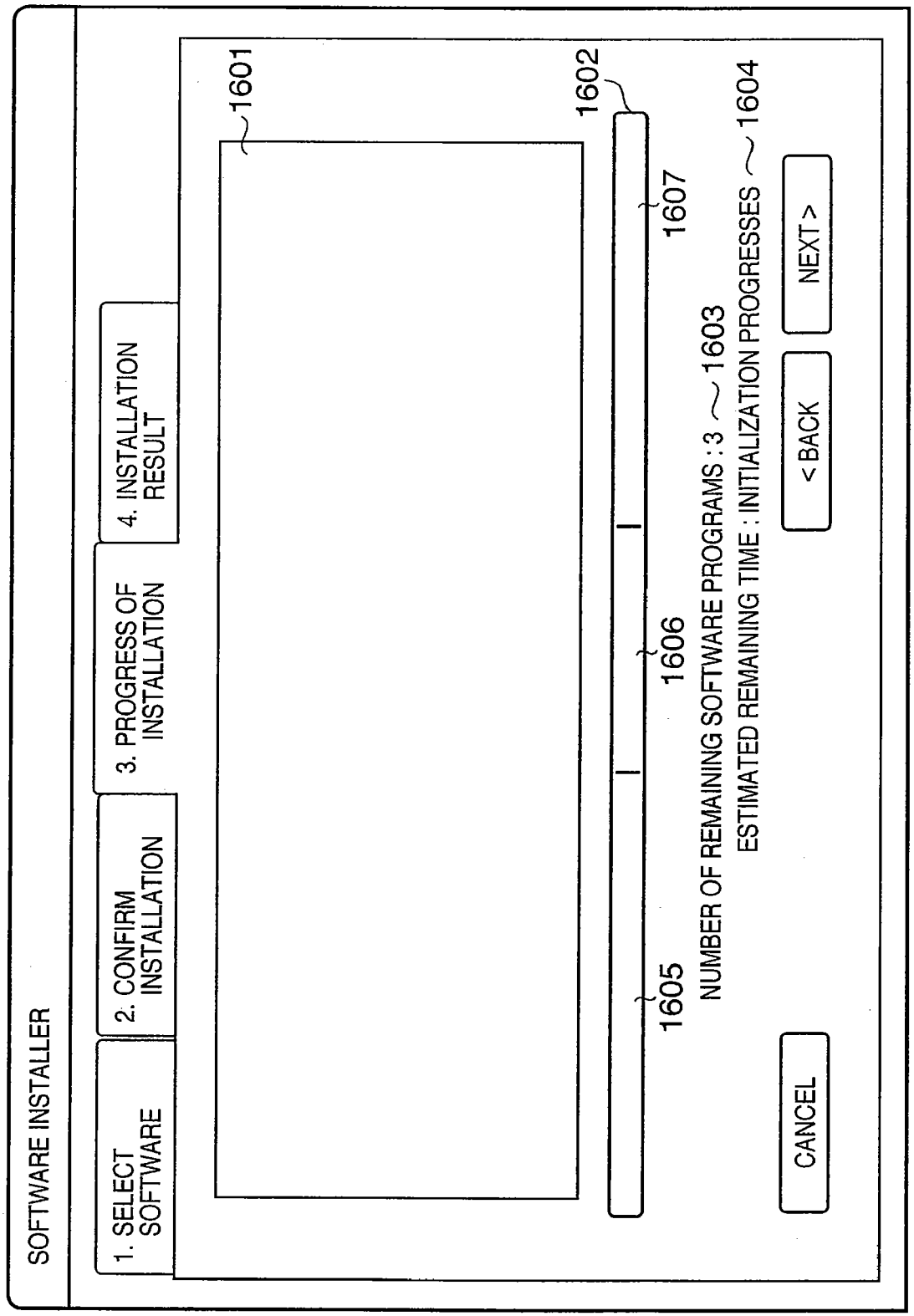

F I G. 17B
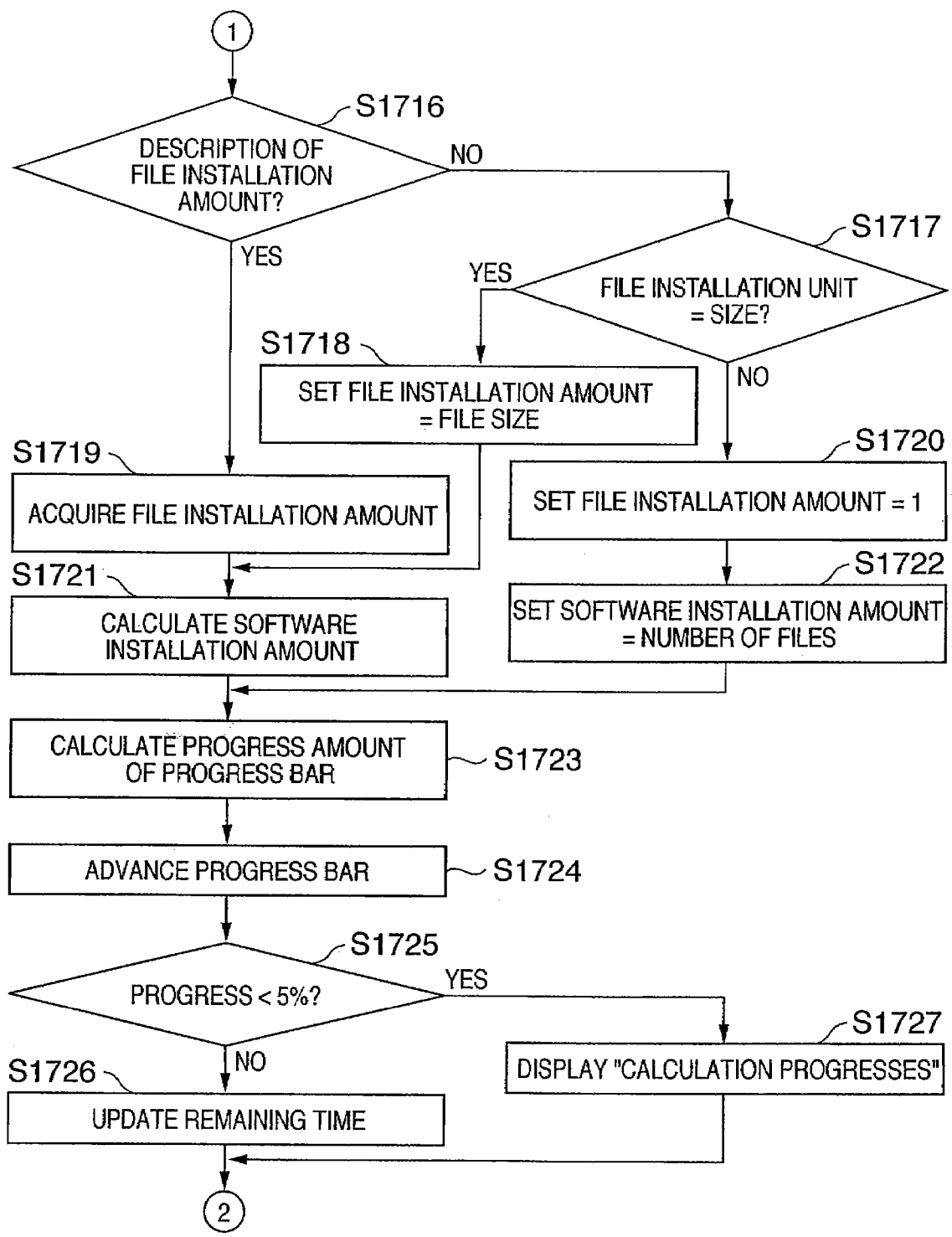

FIG. 21

| FILE NAME | REFERENCE COUNT |
|---|---|
| /Program Files/SoftwareA/MainExecFile.exe | 1 |
| /Program Files/Shared Files/SharedLib.dll | 3 |
| /Program Files/Component B/ComponentBMain.dll | 1 |
| /Program Files/Component B/ComponentBSub1.dll | 1 |
| /Program Files/Component B/ComponentBSub2.dll | 1 |
| /Program Files/Shared Files/CompShare.lib | 4 |
| /Program Files/Component C/ComponentC.dll | 1 |
| ... | ... |

[General]
LastUpdate="2005 : 12 : 27 : 13 : 47 : 35"

2201 —
[SOFTWARE A] ~2203
"/Program Files/SoftwareA/MainExecFile.exe" ~2204
"/Program Files/Shared Files/SharedLib.dll"
"/Program Files/ComponentB/ComponentBMain.dll"
"/Program Files/ComponentB/ComponentBSub1.dll"
"/Program Files/ComponentB/ComponentBSub2.dll"
"/Program Files/Shared Files/ComponentShared.lib"
"/Program Files/ComponentC/ComponentC.dll"
"/Program Files/Shared Files/ComponentShared.lib"
"/Program Files/Shared Files/SharedLib.dll"
...

2202 —
[SOFTWARE F]
"/Program Files/SoftwareF/Program.exe"
"/Program Files/Shared Files/SharedLib.dll"
"/Program Files/ComponentG/CompG.dll"
"/Program Files/ComponentG/CompGSub.dll"
...

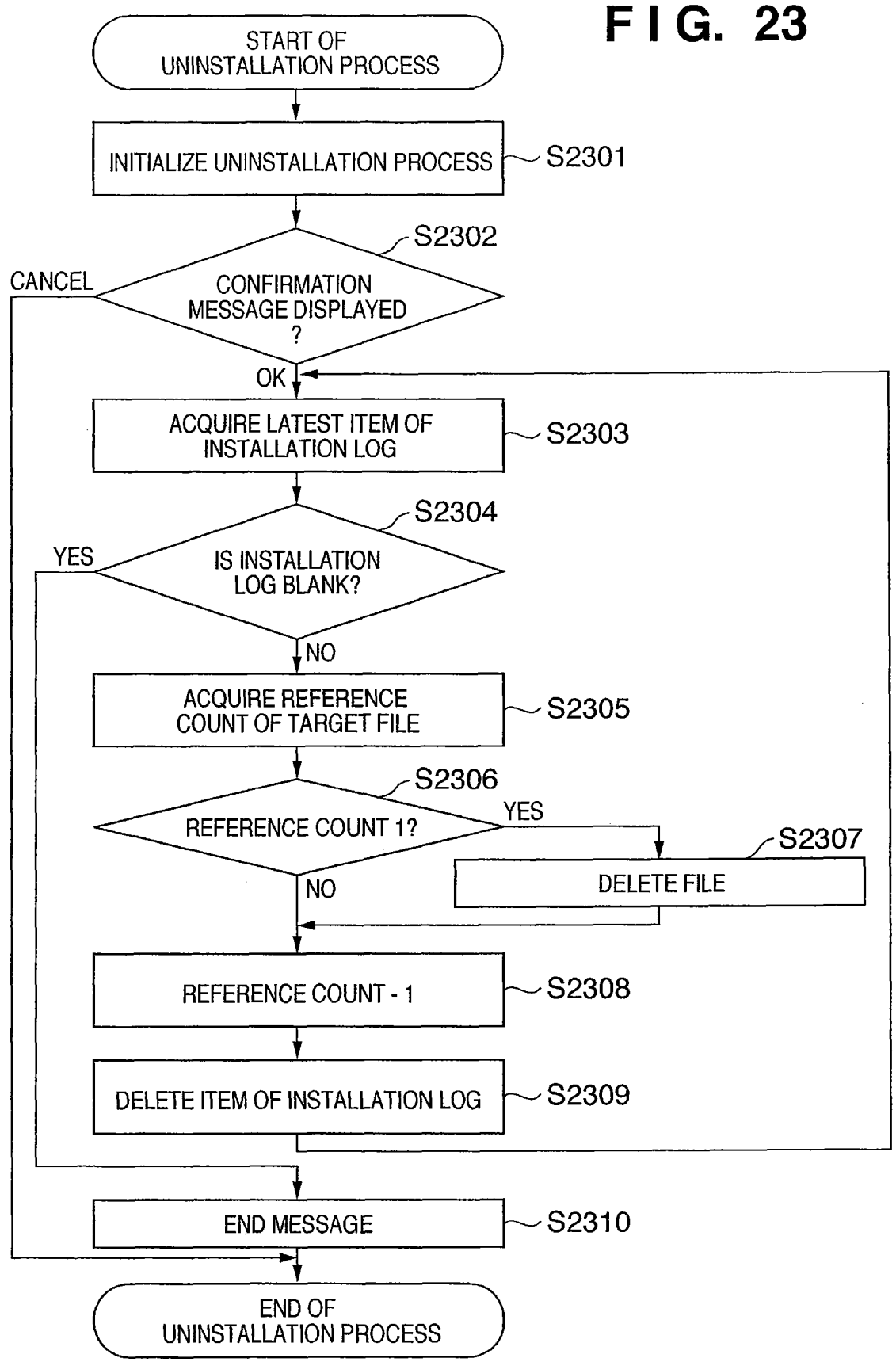

INSTALL APPARATUS, INSTALL METHOD, PROGRAM, AND STORAGE MEDIUM

BACKGROUND OF THE INVENTION

1. Field of the Invention

The present invention relates to a technique of continuously installing a plurality of software programs in a computer.

2. Description of the Related Art

In recent years, it is common practice to distribute program files and data files via an exchangeable medium such as a CD-ROM or a network system such as the Internet. In this case, a program called an installer is generally attached to the distribution target program. The installer copies the distributed file in a storage device such as a hard disk connected to a computer system at the distribution destination, thereby making the distributed program executable in the computer system. The installer also has a function of automatically adjusting necessary settings on the operating system Patent reference 1 (Japanese Patent Laid-Open No. 10-027090) creates an installer by preparing an installer executable file and a data file storing information necessary for installation as separate files. An installer dedicated to specific software is created by rewriting only the data file without changing the installer executable file. This technique simplifies the installer creation procedure.

As the scale of software increases recently, it also has become common practice to separate software into a plurality of components and independently develop each of them. A merit of this developing method is that it is unnecessary to match the schedule of development and distribution to the market between all components. However, to increase the efficiency of this developing method, the installers of the components are also independently developed.

For example, assume that software A contains code that calls components B and C. If the software A and components B and C have no separate installers, a single installer to simultaneously install them is created. If the component C is modified, it is necessary to modify the whole installer. The modified installer, therefore, needs to be redistributed even for the unmodified code of software A and component B.

In a technique generally used to avoid this problem, an installer for the software A, an installer for the component B, and an installer for the component C are independently provided in the above example. Additionally, a program called a master installer to continuously execute the plurality of software installers is distributed simultaneously.

Some systems wherein such a master installer continuously activates a plurality of installers display a window to allow a user to select software to be installed. For example, a window to make a user select whether to install each software program onto a computer is displayed. A user who does not require, e.g., panoramic image composition can omit installation of panoramic image composition software.

FIG. 24 shows an example of a software selection window. A check box region 2401 makes a user select installation execution/non-execution of each software. The user can select software by clicking on this region. A software name display region 2402 displays software names. A disk capacity display region 2403 displays a disk capacity necessary for installation of software. A sum of disk capacities necessary for software is displayed here. A software explanatory text region 2404 displays an explanation of software selected from the software list.

This window is displayed by the above-described master installer. For example, if the disk capacity necessary for installation of certain software changes, information the master installer displays also needs to change. The master installer must always grasp the latest information of each software and continuously update the information to the latest version. This requires developers to expend enormous efforts.

To, e.g., extract only specific software and distribute it to users in a system wherein a master installer executes a plurality of software installers, it is necessary to attach the master installer to the software. However, the master installer is not designed to install single software and therefore needs to be modified for single software installation.

The above-described system that continuously activates a plurality of installers has still another problem. Since the system continuously executes a plurality of installation processes, a long time is required until the whole installation process finishes. In many cases, the master installer shows the state of progress of the installation process to the user.

For example, conventionally, the master installer that controls the entire installation process causes the installer of each software to display the state of progress of installation, though the state of progress of whole installation process is not displayed. The user can grasp the state of progress of installation process of each software but not the state of progress of whole installation process.

Patent reference 2 (Japanese Patent No. 03578135) proposes a technique of solving this problem. The total number of drivers to be installed is represented by 100%, which is divided by the number of drivers to be installed. When installation actually starts, the state of progress approaches 100% on the basis of the number of installed drivers. In this way, the state of progress of whole installation process of device drivers is expressed on the basis of the number of drivers. This proposal allows a user to know the state of progress of whole installation process on the basis of the number of drivers.

This proposal however has the following problem. Software to be installed has an equal size only in a rare case. It is sometimes impossible to accurately show the state of progress of whole installation process by the number of software programs because the degree of progress changes between them.

SUMMARY OF THE INVENTION

The present invention has been made in consideration of the above-described problems, and has as its object to obviate the need for updating a master installer even when one of a plurality of software programs to be installed is modified.

It is another object of the present invention to obviate the need for modifying a master installer even when one of a plurality of software programs is extracted and distributed.

It is still another object of the present invention to display the state of progress of whole installation process in a form easily recognizable by a user in continuously installing a plurality of software programs.

In order to solve the above-described problems and achieve the objects, according to the first aspect of the present invention, there is provided an install apparatus for installing a plurality of programs, comprising: a first storage unit configured to store, for each program, an installation-setting file and an installation target file in correspondence with each other; a reading unit configured to read the installation-setting files of the plurality of programs in accordance with one installation executable file; and a second storage unit configured to store the installation target files corresponding to the installation-setting files in an order in accordance with the installation-executable file and the installation-setting files.

According to the second aspect of the present invention, there is provided a method of installing a plurality of programs, comprising: a first storage step of storing, for each program, an installation-setting file and an installation target file in correspondence with each other; a reading step of reading out the installation-setting files of the plurality of programs in accordance with one installation executable file; and a second storage step of storing the installation target files corresponding to the installation-setting files in order in accordance with the installation executable file and the installation-setting files.

According to the third aspect of the present invention, there is provided a program that causes a computer to execute a method of installing a plurality of programs, comprising: a code of a first storage step of storing, for each program, an installation-setting file and an installation target file in correspondence with each other; a code of a reading step of reading out the installation-setting files of the plurality of programs in accordance with one installation executable file; and a code of a second storage step of storing the installation target files corresponding to the installation-setting files in order in accordance with the installation executable file and the installation-setting files.

According to the fourth aspect of the present invention, there is provided a storage medium storing a program that causes a computer to execute a method of installing a plurality of programs, the program comprising: a code of a first storage step of storing, for each program, an installation-setting file and an installation target file in correspondence with each other; a code of a reading step of reading out the installation-setting files of the plurality of programs in accordance with one installation executable file; and a code of a second storage step of storing the installation target files corresponding to the installation-setting files in order in accordance with the installation executable file and the installation-setting files.

Optional features of the present invention are described in the dependent claims.

Further features of the present invention will become apparent from the following description of exemplary embodiments with reference to the attached drawings.

BRIEF DESCRIPTION OF THE DRAWINGS

FIG. 6 is a view showing an example of a software list generated by executing the software-list generation-process in FIG. 5 for the folder arrangement in FIG. 2 by using the installer operation-setting file 202 in FIG. 4;

FIG. 10 is a view showing a software installation-setting file 216 as another example of the software installation-setting file;

FIG. 12 is a view showing an example of a software-list generated by executing the software-list generation-process in FIG. 5 for the folder arrangement in FIG. 8 by using the operation-setting file 202 in FIG. 4;

FIG. 15 is a view showing an example of the installation progress window displayed by selecting all software programs on the software selection window in FIG. 13 and executing the installation progress window initialization process described in FIG. 14;

FIG. 16 is a view showing an example of the installation progress window displayed by canceling selection of software A on the software selection window in FIG. 13 and executing the installation progress window initialization process described in FIG. 14;

FIG. 17B is a flowchart showing details of an installation execution process in step S309;

FIG. 21 is a view showing the internal structure of a file reference count database that is held in the operating system and used for the installation process;

FIG. 22 is a view showing part of an installation log created by the installation process in FIG. 14;

FIG. 23 is a flowchart showing details of an uninstallation process according to the embodiment.

DESCRIPTION OF THE EMBODIMENT

A preferred embodiment of the present invention will be described below in detail with reference to the accompanying drawings.

Figure 1A:
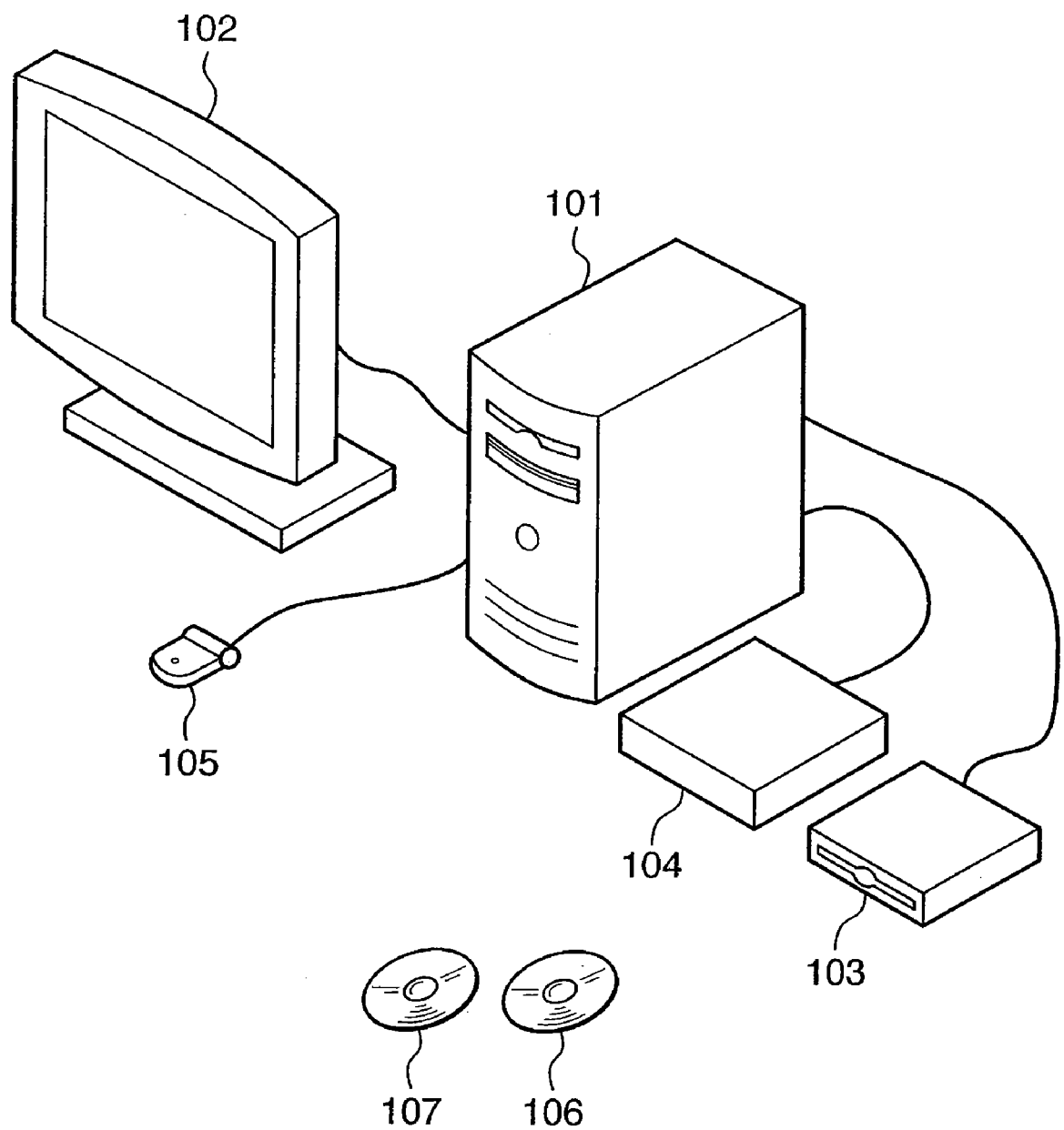
FIG. 1A is a view showing the arrangement of a system according to an embodiment of the present invention.

FIG. 1A is a view showing the arrangement of a system according to an embodiment of the present invention.

A display 102, optical disk drive 103, hard disk 104, and mouse 105 are connected to a computer 101 in the system. An exchangeable optical disk 106 records programs and data. The computer 101 executes a program read out from the optical disk 106 inserted in the optical disk drive 103. The computer 101 draws on the connected display 102 to display a confirmation message to the system user or notifies him/her of the system state. The system user can respond to the confirmation message displayed on the display 102 by using the mouse 105. The computer 101 can copy data recorded on the optical disk 106 to the hard disk 104 or rewrite data recorded in the hard disk 104 in accordance with program contents. In this system, the optical disk 106 is exchangeable. For example, another optical disk 107 is also usable.

Figure 1B:
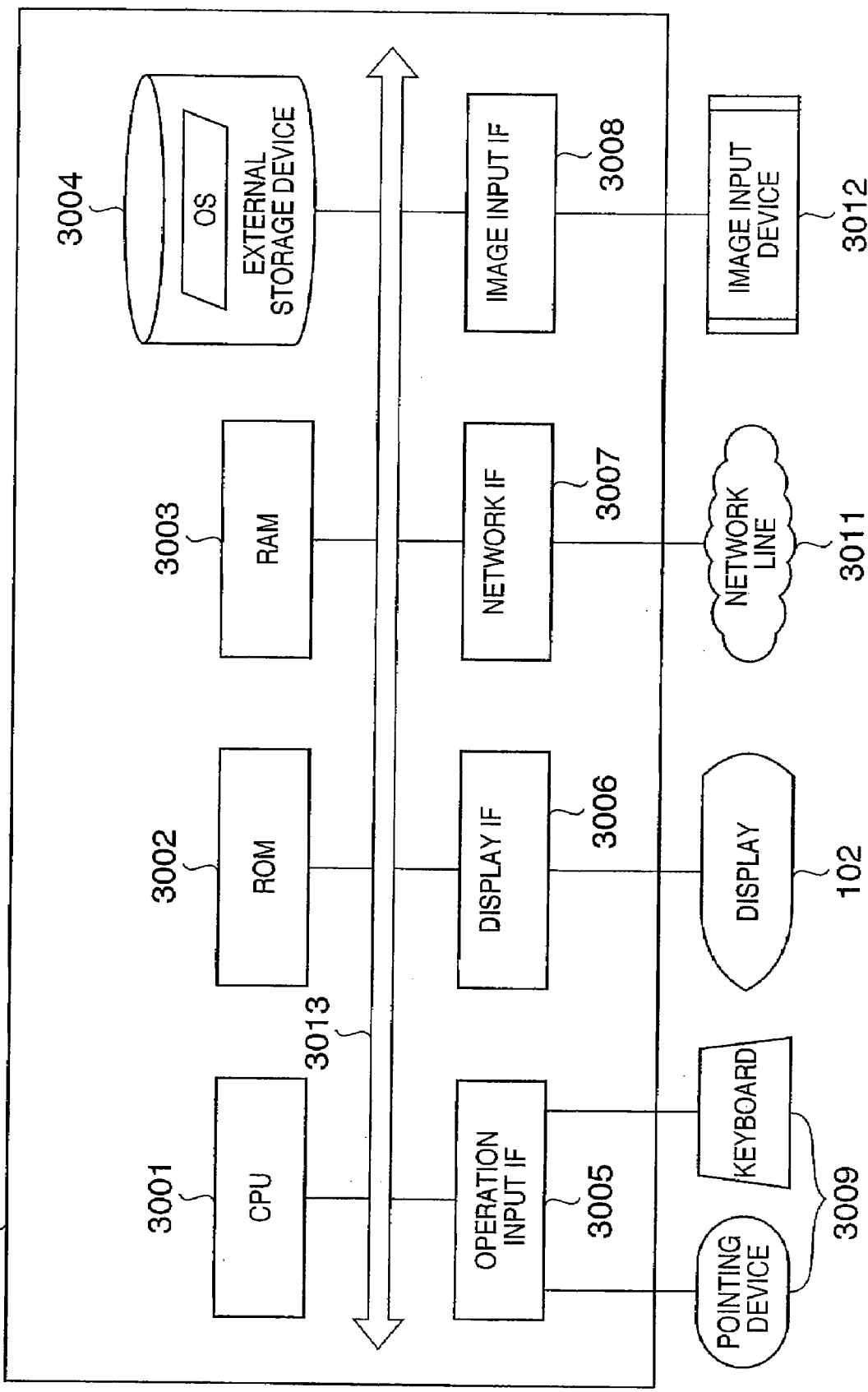
FIG. 1B is a block diagram showing the configuration of a computer system shown in FIG. 1A.

FIG. 1B is a block diagram showing the configuration of the computer system shown in FIG. 1A.

Referring to FIG. 1B, a central processing unit (CPU) 3001 controls the entire computer system. A read only memory (ROM) 3002 stores programs and parameters which require no change. A random access memory (RAM) 3003 temporarily stores programs and data supplied from, e.g., an external device. An external storage device 3004 includes a hard disk and memory card permanently installed in the computer 101, and a floppy disk (FD), an optical disk such as a compact disk (CD), magnetic, optical, and IC cards, and a memory card which are detachable from the computer 101. The external storage device 3004 also includes the optical disk drive 103 and hard disk 104 shown in FIG. 1A. An interface 3005 connects to an input device 3009 such as a pointing device and keyboard that inputs data in accordance with user operation. The input device 3009 includes the mouse 105 shown in FIG. 1A. An interface 3006 connects to the display 102 to display data held by the computer 101 and supplied data. A network interface 3007 connects to a network line 3011 such as the Internet. An image input interface 3008 inputs image data from an image input device 3012 such as a digital camera or scanner to the computer 101. A system bus 3013 connects the units 3001 to 3008 to make them communicable.

Figure 2:
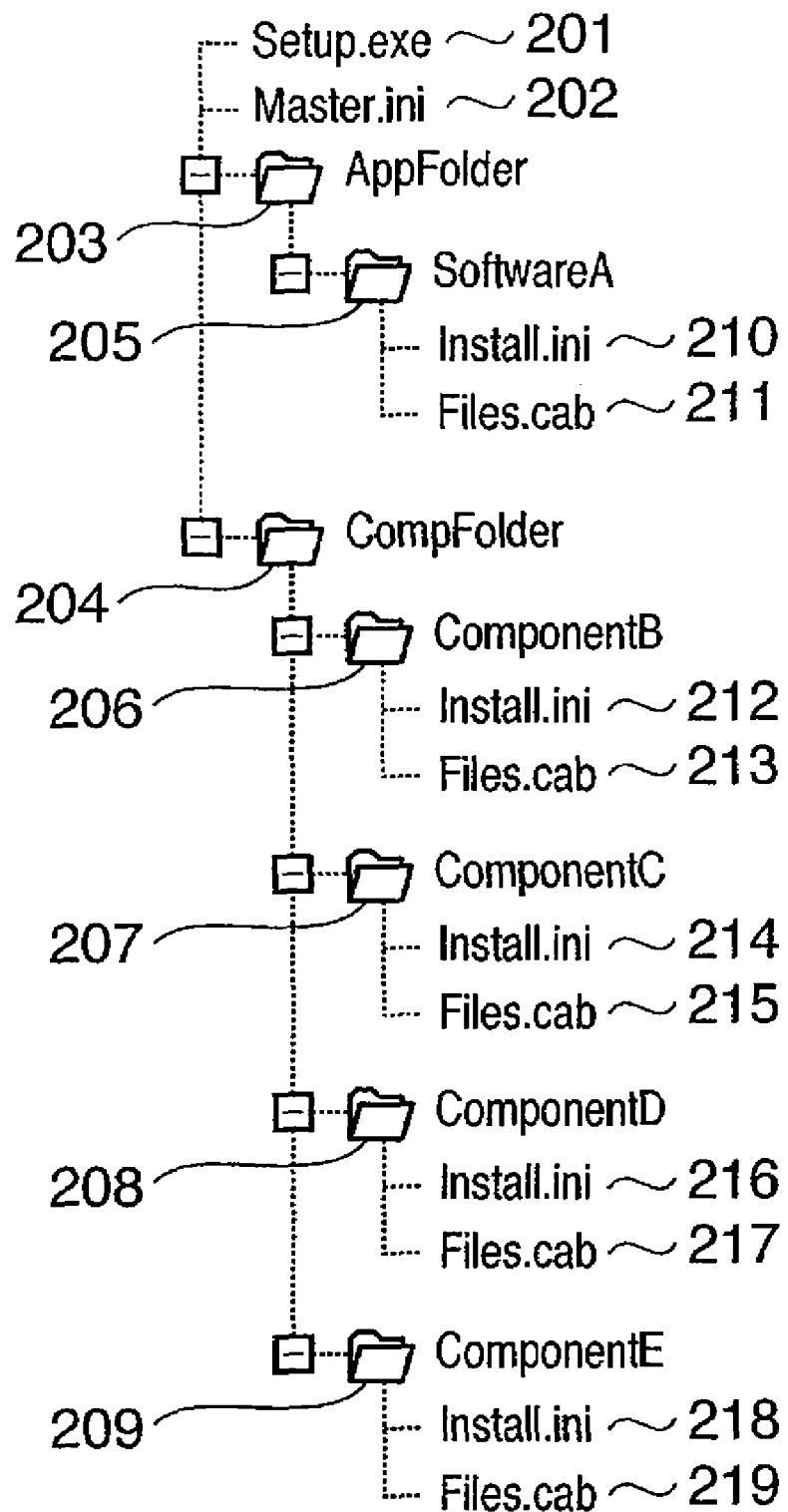
FIG. 2 is a view showing an example of the structure of a program and data file recorded on an optical disk 106.

FIG. 2 is a view showing an example of the structure of a program and data file recorded on the optical disk 106.

An installer executable file 201 as an only executable file recorded on the optical disk and an installer operation-setting file 202 to control details of the operation of the installer executable file exist on the optical disk 106. The installer executable file 201 will sometimes be referred to as a master installer hereinafter. An application folder 203 and component folder 204 are also present on the optical disk 106. The application folder 203 contains a folder 205. The component folder 204 contains four sub folders 206 to 209.

The folder 205 contains data and information necessary for installing software A. More specifically, the folder 205 contains a software installation-setting file 210 and a software configuration file 211 as an installation target. The folders 206 to 208 contain data and information necessary for installing components D, B, and C of the software A, respectively.

More specifically, the folder 206 contains a software installation-setting file 212 and a software configuration file 213.

The folder 207 contains a software installation-setting file 214 and a software configuration file 215.

The folder 208 contains a software installation-setting file 216 and a software configuration file 217.

The folder 209 contains data and information necessary for installing a sub component E required to cause the component B of the software A to run. More specifically, the folder 209 contains a software installation-setting file 218 and a software configuration file 219.

When the installer executable file 201 recorded on the optical disk 106 of this embodiment is executed on the system, the software A, its components B, C, and D, and the sub component E of the component B are installed in the hard disk 104.

Figure 3:
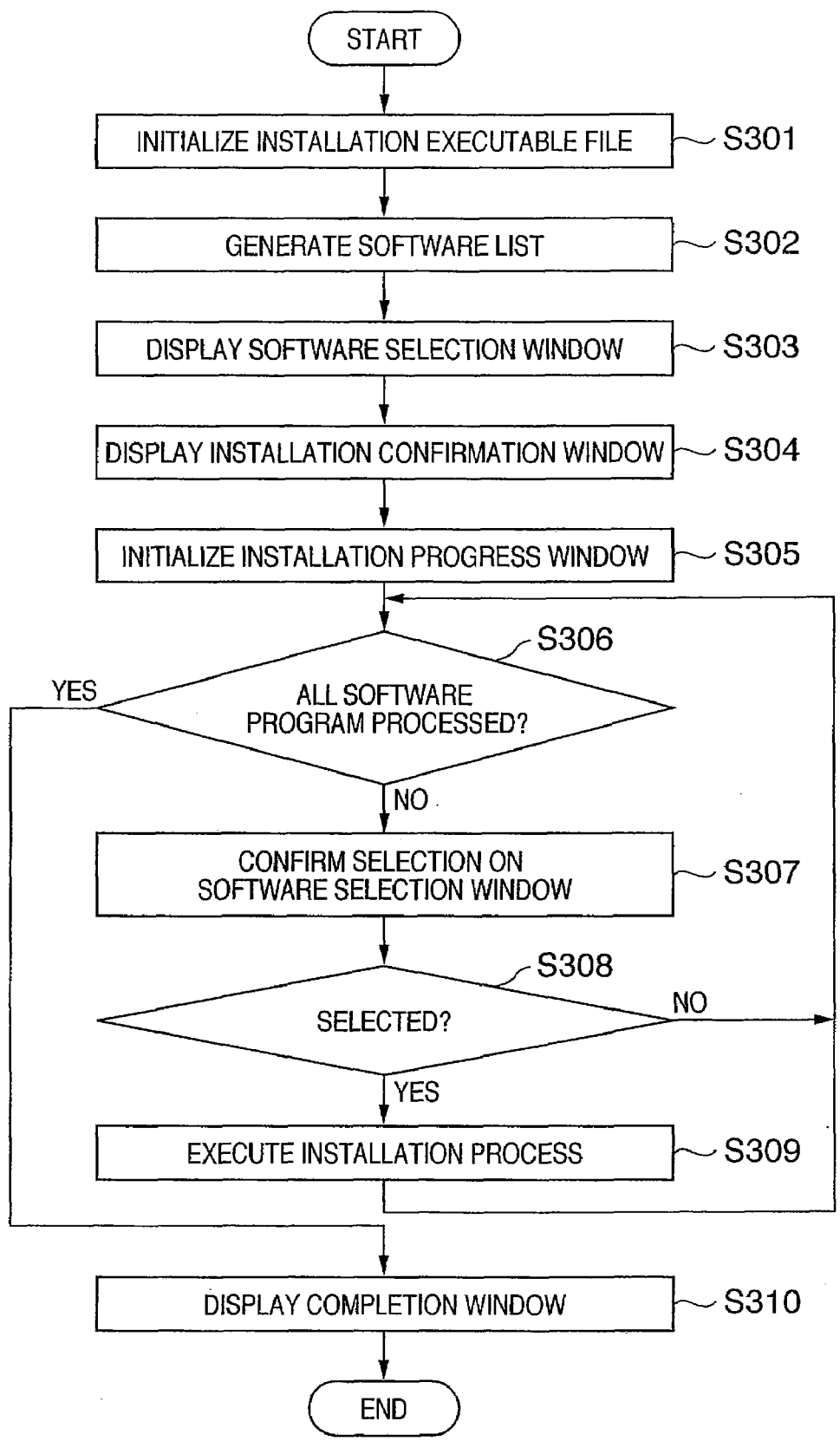
FIG. 3 is a flowchart showing the whole software installation process of the system according to the embodiment.

FIG. 3 is a flowchart showing the whole software installation process of the system.

In step S301, the installer executable file is initialized. The CPU 3001 reads out the installer operation-setting file 202 in accordance with the contents of the installer executable file 201 and initializes the installation process.

In step S302, a software list is generated. The CPU 3001 reads out the plurality of software installation-setting files recorded on the optical disk 106 and generates a software list in accordance with their contents.

In step S303, a software selection window is displayed. The CPU 3001 displays a software selection window on the display 102 on the basis of the software list generated in step S302. The system user can select installation target software on this window.

In step S304, an installation confirmation window is displayed. The CPU 3001 displays, on the display 102, the text of a license agreement necessary for installation to permit only a user who has agreed to it to execute installation.

In step S305, the CPU 3001 initializes an installation progress window.

In step S306, the CPU 3001 checks whether all software in the software list generated in step S302 are installed. If YES in step S306, the process advances to step S310. If unprocessed software remains, the process advances to step S307.

In step S307, the CPU 3001 confirms whether the software that is being processed is selected on the software selection window. The CPU 3001 determines the result in step S308. If the software is selected, the process advances to step S309. If the software is not selected, the process returns to step S306 to process the next software in the software list.

In step S309, the CPU 3001 reads out the software installation-setting file of the software that is being processed, copies the software configuration file in the hard disk 104 on the basis of the described contents, and records the installation process contents on a log.

In this embodiment, a plurality of selected software programs can be installed by using one installation executable file by repeatedly executing the process in steps S306 to S309 in the above-described way.

When all software programs are installed, step S310 is executed. The CPU 3001 displays, on the display 102, an installation result output window on the basis of the installation result of each software up to the preceding step. When the user performs a completing operation on this window, the software installation process of this system finishes.

Figure 4:
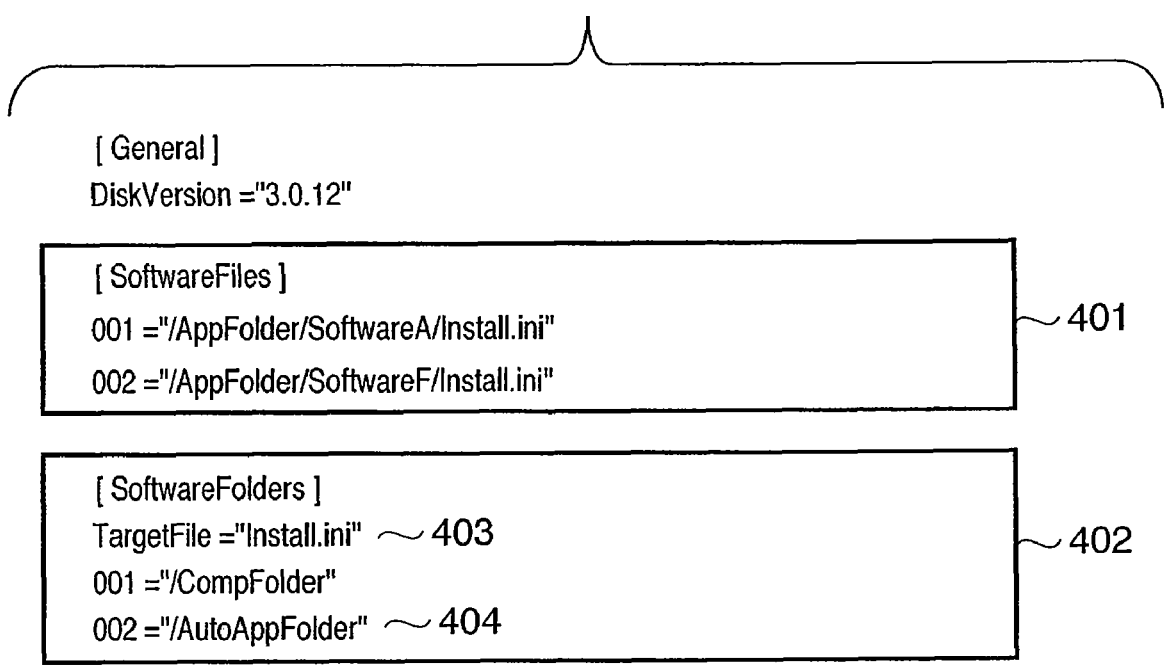
FIG. 4 is a view showing part of the description of an installer operation-setting file 202 recorded on the optical disk 106 according to the embodiment.

FIG. 4 is a view showing part of the description of the installer operation-setting file 202 recorded on the optical disk 106 according to this embodiment. The installer operation-setting file 202 contains a file section 401 and a folder section 402. The folder section 402 contains a search target file name 403 and a search target folder list 404. A search target file indicates all files installable by the installer executable file 201 (master installer). In the software-list generation-process (to be described below), the search target file is searched from the optical disk 106. This is because the optical disk 106 does not always record all the plurality of software files installable by the master installer. Hence, to generate a list including only the software files recorded on the optical disk 106, the above-described search process is executed.

Figure 5:
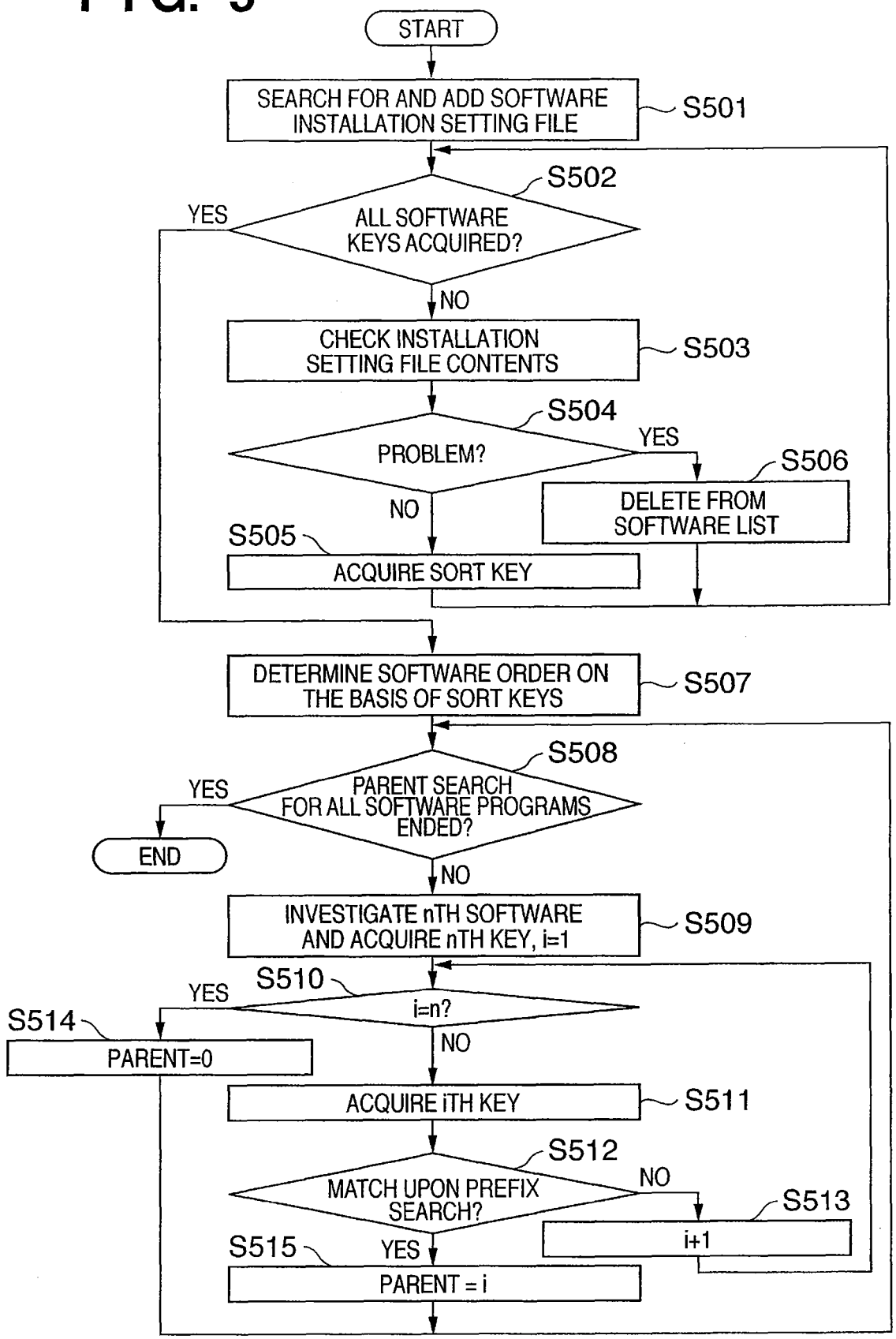
FIG. 5 is a flowchart showing details of a software-list generation-process in step S302 of the software installation process of the system according to the embodiment.

FIG. 5 is a flowchart showing details of the software-list generation-process in step S302 of the software installation process of the system.

In step S501, a software installation-setting file to be added to the software list is searched from the optical disk 106. More specifically, the CPU searches for all files described in the file section 401 of the installer operation-setting file 202 and folders included in the search target folder list 404 described in the folder section 402. The search target includes files with names that match the search target file name 403. A file found on the optical disk 106 is added to the software list.

In step S502, the CPU determines whether a sort key is acquired for all software installation-setting files in the software list. If the process is complete for all software programs, the process advances to step S507. If unprocessed software remains, the process advances to step S503 to check the contents of the software installation-setting file.

In step S504, the check result is acquired. If the file does not exist, or if the file exists but has a problem in the file format or contents, the process advances to step S506 to delete the software from the software list. If the file has no problem, the process advances to step S505 to acquire a "sort key" character string to be used to sort the software list from the software installation-setting file and records the software in the software list. Then, the process returns to step S502 to process the next software.

When all software programs are processed, the order of software programs in the software list is determined in step S507 on the basis of the acquired sort key character strings of the software, i.e., by comparing the character codes of the character strings and sorting them in ascending order of the sizes. The order is recorded in the software list, and the process advances to step S508. In the process from step S508, the software process is executed in accordance with the recorded order, i.e., ascending order of software programs.

In step S508, the CPU confirms whether all software programs in the software list have undergone parent software search. If the process is ended, the CPU finishes the software-list generation-process. If software that has not undergone parent software search yet remains, the process advances to step S509.

In steps S509 to S515, parent software of the nth software is searched for in the software list.

In step S509, the variable is initialized. The sort key character string of the nth software is acquired, and 1 is set to a loop variable i. In step S510, the loop variable i is compared with n to determine whether i=n. If i=n, the parent software of the nth software is not found. In step S514, 0 is written in the item of "Parent" of the software list. The parent software search process of the nth software is ended, and the process returns to step S508. If i≠n, the sort key character string of the ith software in the software list is acquired in step S511. In step S512, the CPU determines whether the key character string of the nth software matches the key character string of the ith software upon prefix search. That is, the CPU determines whether the top of the key character string of the nth software matches the key character string of the ith software. If the character strings do not match, the loop variable i is incremented by one in step S513, and the process returns to step S510. If the character strings match, i is written in the item of "parent" of the software list in step S514. The parent software search process of the nth software is ended, and the process returns to step S508.

FIG. 6 is a view showing an example of a software list generated by executing the software-list generation-process in FIG. 5 for the folder arrangement in FIG. 2 by using the installer operation-setting file 202 in FIG. 4.

The software list contains a file name list 601 serving as a list of the names of the software installation setting files of software, and a sort key list 602 serving as a list of sort keys described in the software installation-setting files. The software list also contains a sequence list 603 as a result of the software-list generation-process, and a parent list 604 representing parent software. The file name list 601 contains the software installation-setting files included in the folder arrangement in FIG. 2. The software list does not contain any file that is described in the file section 401 of the installer operation-setting file 202 in FIG. 4 but not actually included in the folder arrangement in FIG. 2.

The sequence list 603 determines the order of software programs on the basis of the values of the sort key list 602. In the folder arrangement shown in FIG. 2, 1 is set to the software A, 2 is set to the component B of the software A, 3 is set to the sub component E of the component B of the software A, 4 is set to the component C of the software A, and 5 is set to the component D of the software A. In the software parent list 604, 0 is recorded for the software A, and 1 is recorded for the remaining components. In this case, "1" indicates the software A with the value "1" in the sequence list.

Figure 7:
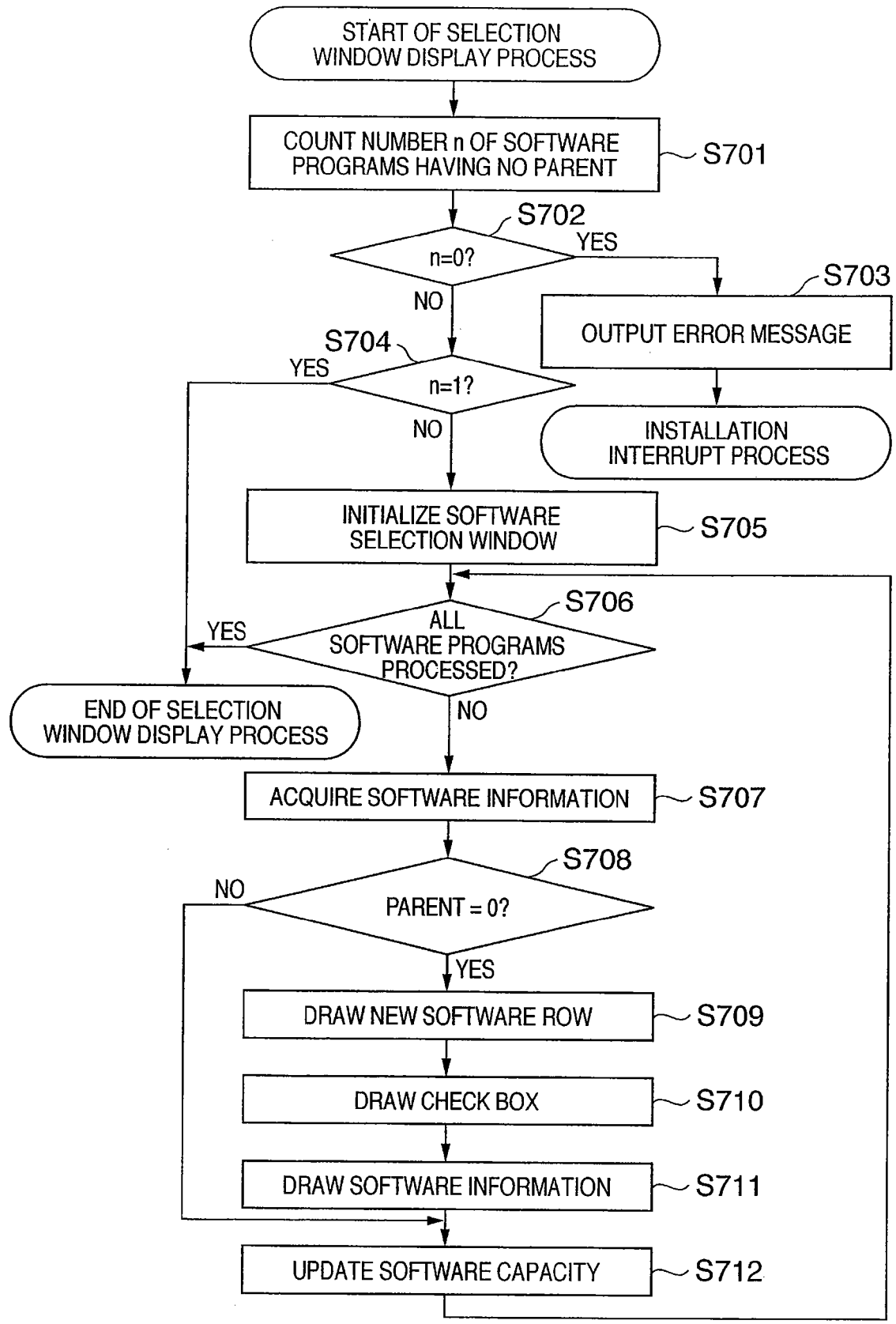
FIG. 7 is a flowchart showing details of a software selection window display process in step S303 of the software installation process of the system according to the embodiment.

FIG. 7 is a flowchart showing details of the software selection window display process in step S303 of the software installation process of the system.

In step S701, the CPU counts a software program having zero parent in the software list, i.e., the number n of software programs serving as parents. In step S702, the CPU determines whether n=0. If n=0, no software serving as a parent exists in the software list. In step S703, an error message is output, and the installation process is interrupted. If n≠0, the process advances to step S704.

In step S704, the CPU determines whether n=1. If n=1, only one software serving as a parent exists in the software list. Hence, it is unnecessary to display the software selection dialogue. If n=1, the selection window display process is ended, and the process advances to the next confirmation window display process (step S304).

If n>1, the process advances to step S705 to initialize the software selection window. From step S706, all software programs included in the software list are displayed on the software selection window.

In step S706, the CPU determines whether all software programs are processed. If the process is ended, the selection window display process finishes. If unprocessed software remains, information to be presented to the user at the time of software installation is acquired in step S707 from the software installation-setting file recorded in the software list. In this embodiment, pieces of information about the software name, software version number, an icon representing the software, a detailed explanation of the software, and the disk capacity necessary for installing the software are acquired.

In step S708, the CPU checks whether the information of "parent" recorded in the software list is 0. If information except 0 is recorded for "parent", the process advances to step S712. If "parent" is 0, i.e., no parent software is present, the process advances to step S709.

In step S709, a new software row is added to the end on the displayed software selection window. In step S710, a check box is displayed at the top of the software row added in step S709. In step S711, of the various kinds of information acquired in step S707, pieces of information except that about the disk capacity necessary for installation are drawn in the software row added in step S709.

In step S712, the software capacity is drawn in the software selection window. More specifically, the disk capacity of the software that is being processed currently is added to the disk capacity of software described at the end of the final software row in the software selection window, and drawing is updated. When updating finishes, the process returns to step S706.

In the optical disk having the folder arrangement shown in FIG. 2, only the software A has 0 for "parent". In this case, when the process in FIG. 7 is executed, nothing is displayed in the software selection window display process as a result of the process in step S703, and the process advances to the next confirmation window display process.

Figure 8:
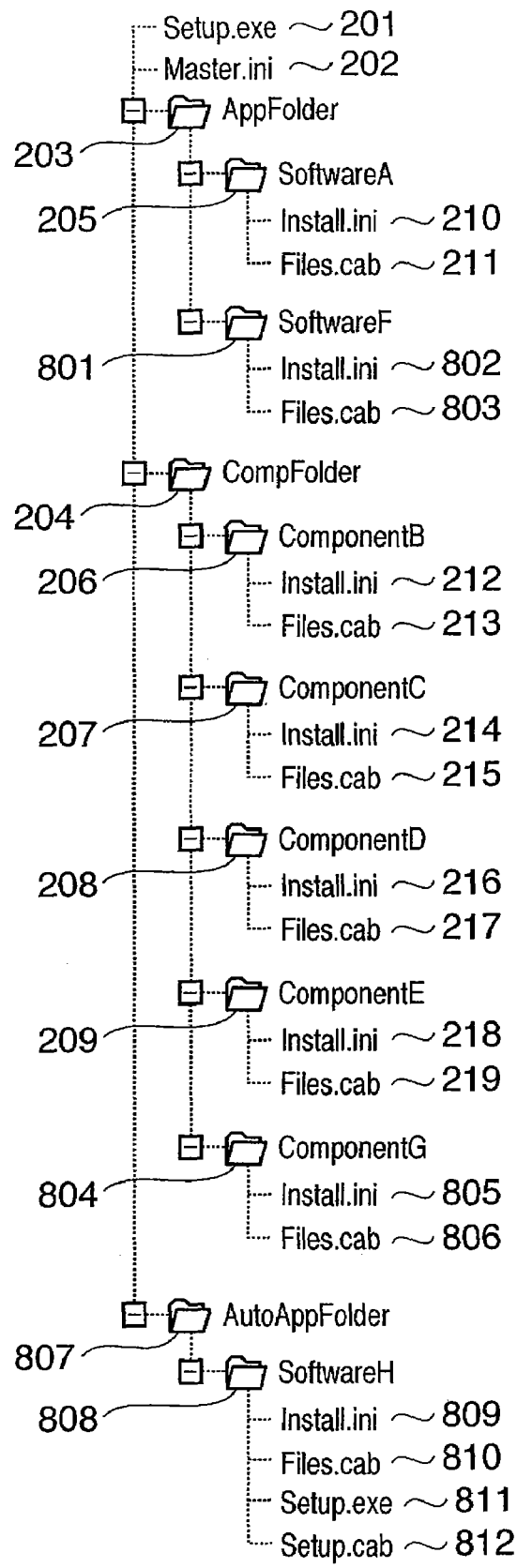
FIG. 8 is a view showing the folder arrangement of another optical disk 107.

FIG. 8 is a view showing the folder arrangement of another optical disk 107.

The arrangement of the optical disk 107 is obtained by adding several folders and files to the arrangement of the optical disk 106. The installer executable file 201, installer operation-setting file 202, application folder 203, component folder 204, and folders 205 to 209 are the same as those of the optical disk 106. The software installation-setting files 210, 212, 214, 216, and 218 and software configuration files 211, 213, 215, 217, and 219 are also the same as those of the optical disk 106.

In the optical disk 107, the application folder 203 includes a folder 801 containing data and information necessary for installing software F. The folder 801 contains a software installation-setting file 802 and a software configuration file 803 as an installation target. The component folder 204 includes a folder 804 containing data and information necessary for installing a component G. The folder 804 contains a software installation-setting file 805 and a software configuration file 806 as an installation target.

An additional application folder 807 to store additional software exists in the same layer as the application folder 203 and component folder 204. The additional application folder 807 includes a folder 808 containing data and information necessary for installing software H. The folder 808 contains an external installer executable file 811 and an external installer configuration file 812 in addition to a software installation setting file 809 and a software configuration file 810.

Figure 9:
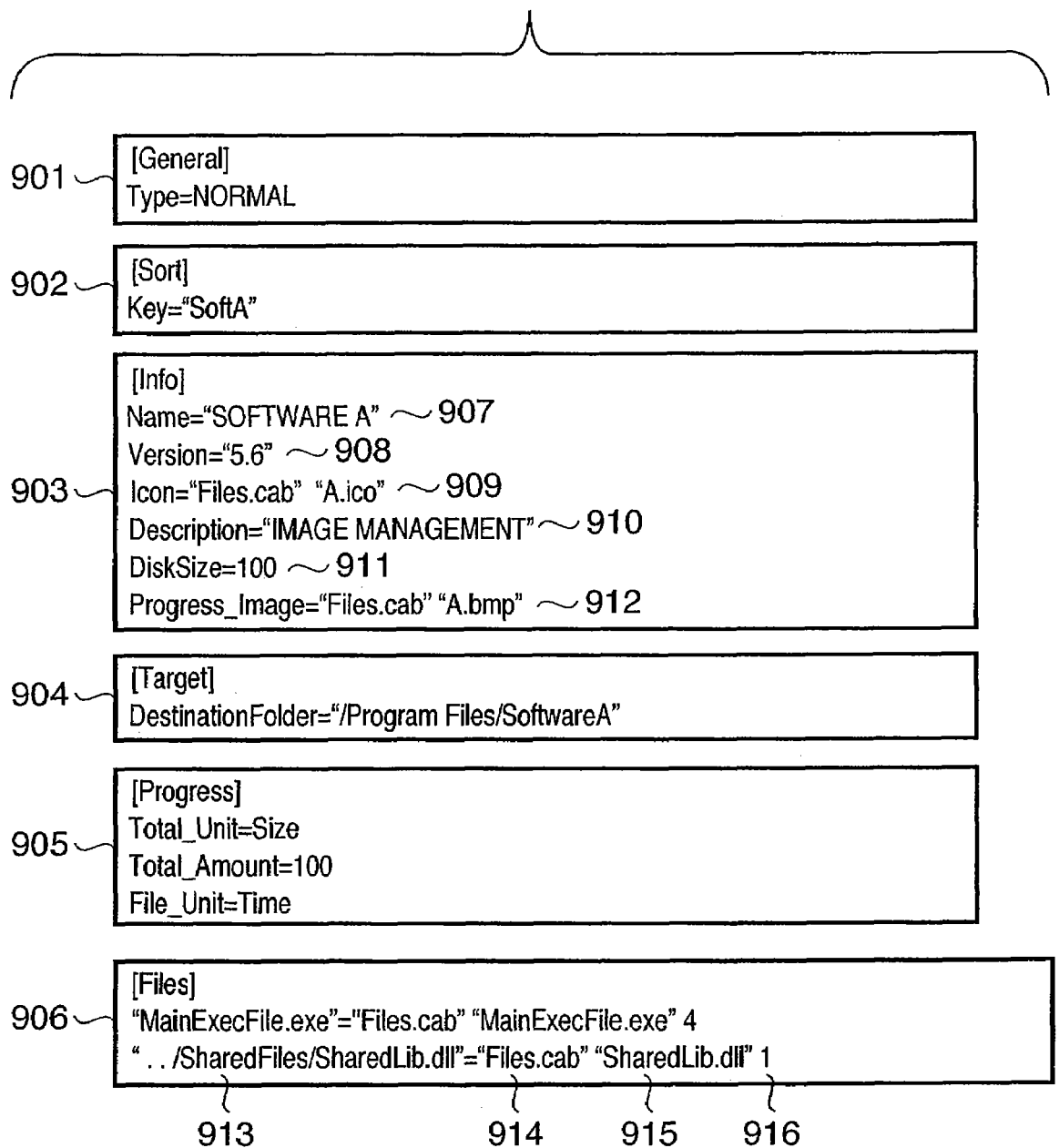
FIG. 9 is a view showing a software installation-setting file 210 as an example of a software installation-setting file.

FIG. 9 is a view showing the software installation-setting file 210 as an example of a software installation-setting file.

The software installation-setting file 210 is a text file including a general section 901, sort section 902, information section 903, installation destination designating section 904, progress information section 905, and file section 906.

The general section 901 describes the installer type. In the software installation-setting file 210, "NORMAL" is designated as a type to indicate a normal installer.

The sort section 902 describes a sort key to be used in the software-list generation-process. In the software installation-setting file 210, "SoftA" is designated.

The information section 903 describes software information to be displayed on the software selection window. This section describes a software name 907, a software version number 908, a location 909 of an icon representing the software on the optical disk, and a detailed explanation 910 of the software. A disk capacity 911 of the software and a location 912 of a software explanatory image on the optical disk are also described.

The installation-destination designating section 904 designates the location of the software installation destination on the hard disk 104.

The progress information section 905 describes information to be used to display the installation progress window. More specifically, this section describes a software installation amount and its unit to be used to divide a progress bar. This section also describes a file installation unit serving as the reference of the installation amount of each file to advance the progress bar in every file copy during installation of each software. In the software installation-setting file 210, a size is used to indicate the software installation amount, and 100 is designated as the installation amount of the software A. In addition, the installation time is used to represent the installation amount of each file.

The file section 906 describes a list of files to be installed. Each file item describes a copy destination file name 913, software configuration file compression file name 914, copy source file name 915, and file installation amount 916.

FIG. 10 is a view showing the software installation-setting file 216 as another example of the software installation-setting file.

The software installation-setting file 216 is also a text file, like the software installation-setting file 210 in FIG. 9. Similarly, the software installation-setting file 216 includes a general section 1001, sort section 1002, information section 1003, installation destination designating section 1004, progress information section 1005, and file section 1006.

The general section 1001 describes "NORMAL" as the installer type.

The sort section 1002 designates "SoftA-CompD".

The information section 1003 describes a software name 1007, a software version number 1008, a location 1009 of an icon representing the software on the optical disk, and a detailed explanation 1010 of the software. A disk capacity 1011 of the software and a location 1012 of a software explanatory image on the optical disk are also described.

The installation-destination-designating section 1004 designates the location of the software installation destination on the hard disk 104.

The description of the progress information section 1005 omits the software installation amount and its unit, unlike the software installation-setting file 210 in FIG. 9. The progress information section 1005 describes that a size is used as the installation amount of each file.

The file section 1006 describes, in each file item, a copy destination file name 1013, software configuration file compression file name 1014, copy source file name 1015, and file installation amount 1016. Note that a value "0" is described as the file installation amount 1016 to represent omission of the description.

Figure 11:
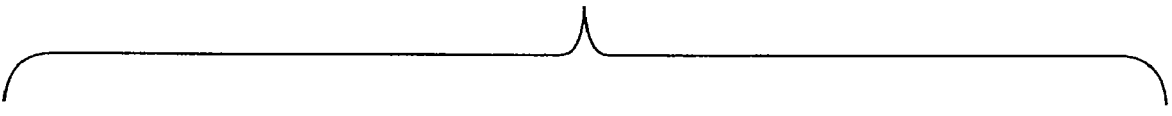
FIG. 11 is a view showing a software installation-setting file 809 as still another example of the software installation-setting file.

FIG. 11 is a view showing the software installation-setting file 809 as still another example of the software installation-setting file.

The software installation-setting file 809 is also a text file, like the software installation-setting file 210 in FIG. 9. Similarly, the software installation-setting file 809 includes a general section 1101, sort section 1102, information section 1103, and progress information section 1104. No installation-destination-designating section or file section is included. The software installation-setting file 809 also includes an external software section 1105.

The general section 1101 describes "EXTERNAL" to indicate a type to activate an external installer.

The sort section 1102 designates "SoftH".

The information section 1103 describes a software name 1106, a software version number 1107, a location 1108 of an icon representing the software on the optical disk, and a detailed explanation 1109 of the software. A disk capacity 1110 of the software and a location 1111 of a software explanatory image on the optical disk are also described.

The progress information section 1104 describes the software installation amount and its unit.

The external software section 1105 describes a location of the external software as an activation target on the optical disk.

FIG. 12 is a view showing an example of a software list generated by executing the software list generation process in FIG. 5 for the folder arrangement in FIG. 8 by using the operation-setting file 202 in FIG. 4.

The software list includes a file name list 1201 serving as a list of names of the software installation setting files of software, and a sort key list 1202 serving as a list of sort keys described in the software installation setting files. The software list also contains a sequence list 1203 as a result of the software-list generation-process, and a parent list 1204 representing parent software.

The file name list 1201 contains the software installation-setting files included in the folder arrangement in FIG. 8. The sequence list 1203 is determined on the basis of the values in the sort key list 1202. In this case, 1 is set to the software A, 2 is set to the component B of the software A, 3 is set to the sub component E of the component B of the software A, 4 is set to the component C of the software A, and 5 is set to the component D of the software A. Additionally, 6 is set to the software F, 7 is set to the component G of the software F, and 8 is set to the software H. In the parent list 1204, 0 is recorded for the software A, F, and H which have no parent. On the other hand, 1 is recorded for the components B, C, D, and E having the software A as a parent, and 6 is recorded for the component G having the software F as a parent.

Figure 13:
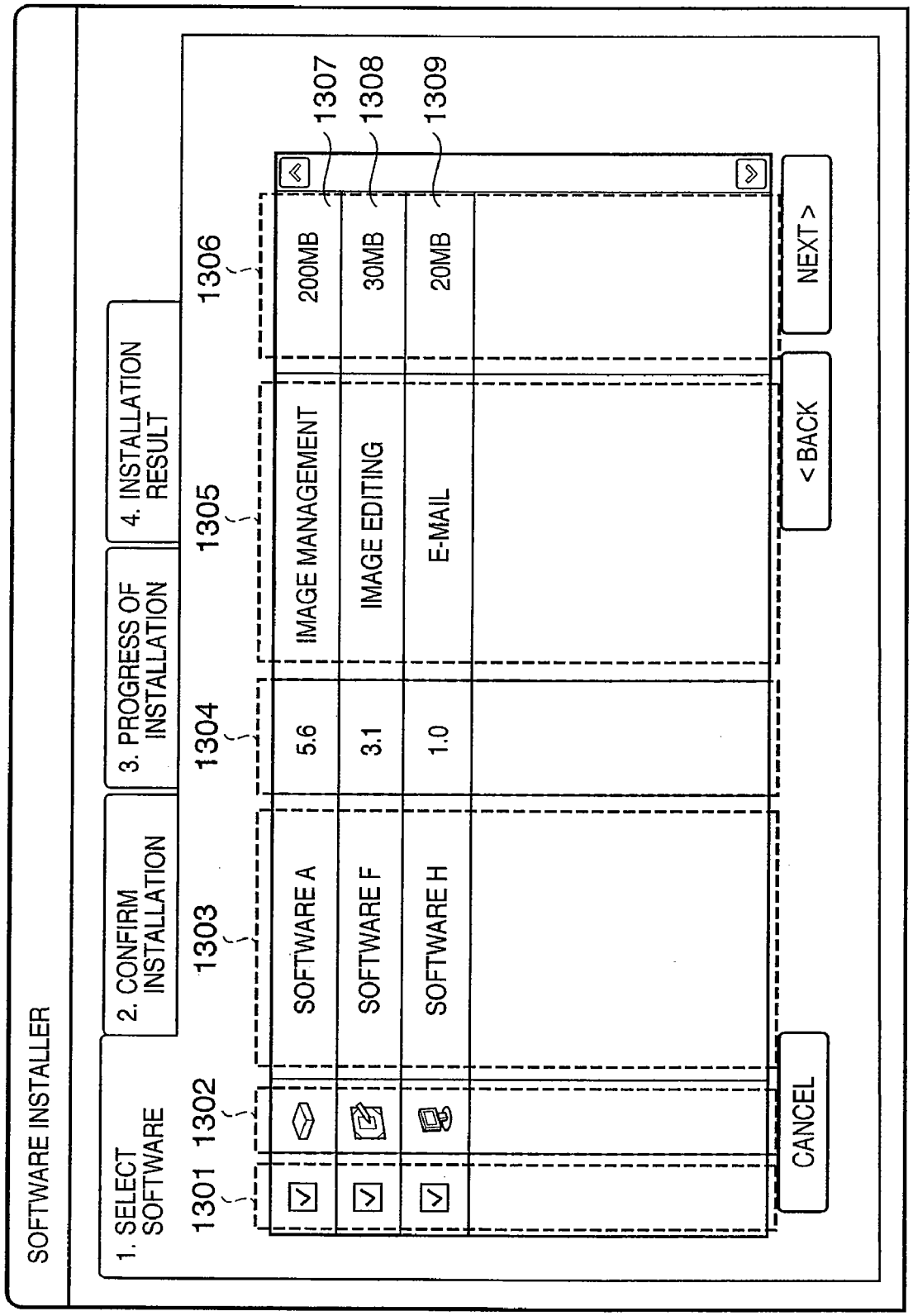
FIG. 13 is a view showing a software selection window displayed by executing the process in FIG. 7 by using the software list in FIG. 12.

FIG. 13 is a view showing a software-selection window displayed by executing the process in FIG. 7 by using the software list in FIG. 12.

The software-selection window comprises a check box region 1301, software-icon region 1302, software-name region 1303, and software-version-number region 1304. The software-selection window also comprises a software-explanatory-text region 1305 and a software-disk-capacity region 1306.

Only the names of software having no parent software in the software list are displayed on the selection window. The names of the three software A, F, and H in the software list in FIG. 12 are displayed.

Check boxes corresponding to the software are drawn in the check box region 1301 in step S710 of FIG. 7. The software-icon region 1302, software-name region 1303, software-version-number region 1304, and software-explanatory-text region 1305 are drawn in the following way. That is, these regions are drawn by using information read out from the software installation-setting files of the respective software in step S711 of FIG. 7.

The software-disk-capacity-region 1306 displays the following capacities. The value of the necessary disk capacity read out from the software installation-setting file of the software of each row is added to the necessary disk capacities of all software having the software of that row as a parent in step S712 of FIG. 7. The sum is displayed in the software-disk-capacity region 1306. More specifically, a disk capacity region 1307 of the row of the software A in the software-disk-capacity region 1306 displays the following value. The disk capacity of the software A itself is added to the disk capacities of the software having the software A as a parent, i.e., the components B, C, D, and E, and the sum is displayed. Similarly, a disk capacity region 1308 of the row of the software F displays the sum of the disk capacity of the software F itself and the disk capacity of the component G having the software F as a parent. A disk capacity region 1309 of the row of the software H displays the disk capacity of the software H because no software has the software H as a parent.

Figure 14:
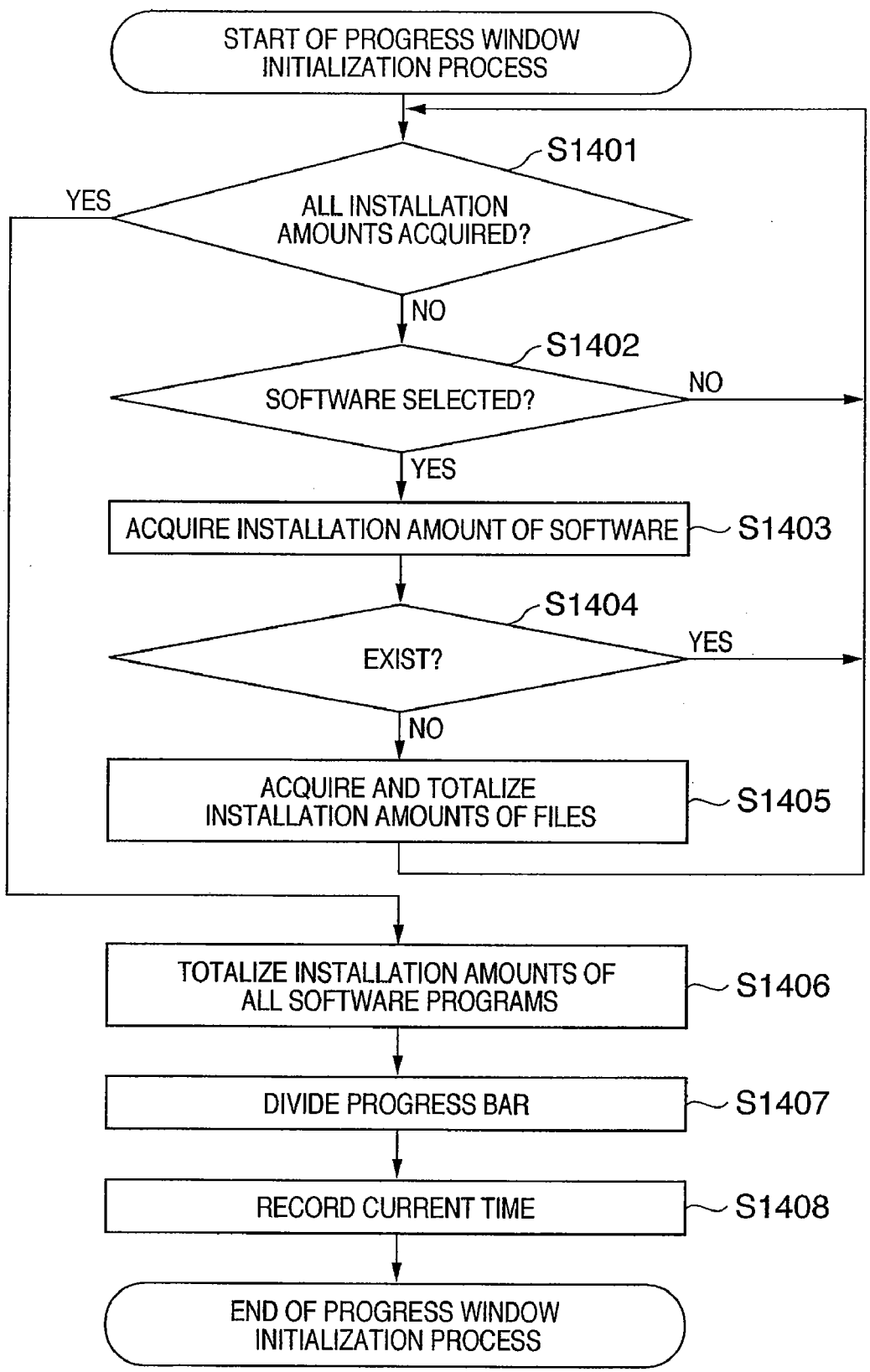
FIG. 14 is a flowchart showing details of an installation progress window initialization process in step S305.

FIG. 14 is a flowchart showing details of the installation progress window initialization process in step S305.

In the installation progress window initialization process, first, the installation amount of all software programs is calculated. Then, the progress bar on the installation progress window is divided in accordance with the installation amount.

In step S1401, the CPU checks whether the installation amounts of all software programs are acquired. If the installation amounts are acquired, the process advances to step S1406. If software to still acquire the installation amount remains, the process advances to step S1402.

In step S1402, the CPU checks whether the software that is being processed, or the parent software of the software that is being processed is selected on the software selection window. If the software that is being processed is selected, the process advances to step S1403. If the software that is being processed is not selected, the installation amount of the software is regarded as 0, and the process returns to step S1401 to acquire the installation amount of the next software.

In step S1403, the installation amount of software is acquired from the software installation-setting file of the software. In step S1404, the CPU determines whether the software-installation-amount acquisition is successful. If it is successful, the process returns to step S1401 to acquire the installation amount of the next software. If acquisition fails, i.e., if the software installation-setting file has no description of the software-installation amount, the process advances to step S1405. The installation amount of each software configuration file described in the software installation-setting file is acquired. The sum of the installation amounts of all files is regarded as the installation amount of the software. The process returns to step S1401 to acquire the installation amount of the next software.

In step S1406, the software-installation amounts acquired up to this time are totalized to obtain the total installation amount of all software.

In step S1407, the total installation amount of all software is defined as 100% of the progress bar on the installation progress window, and the progress bar is divided on the basis of the installation amount of each software. In step S1408, the current time is recorded. This time is used to calculate the elapse time of installation to calculate the estimated remaining time. When the above-described processes are ended, the CPU finishes the installation progress window initialization process.

FIG. 15 is a view showing an example of the installation progress window displayed by selecting all software programs on the software-selection window in FIG. 13 and executing the installation progress window initialization process described in FIG. 14.

A software-explanatory-image display-region 1501, progress bar 1502, remaining software count display region 1503, and estimated remaining time display region 1504 exist in the window. The software-explanatory-image display-region 1501 displays an image for explaining the contents of software. This region is blank immediately after the initialization.

The progress bar 1502 is divided into eight regions 1505 to 1512. These regions correspond to the eight software included in the folder arrangement shown in FIG. 8, i.e., the software A, component B, component A, component C, component D, software F, component G, and software H. In this example, 40%, 12%, 4%, 12%, 12%, 8%, 4%, and 8% (100% in total) are allocated to the respective regions. The remaining software-count display-region 1503 displays the number of remaining software programs during software installation. This region displays the number of divisions of the progress bar, i.e., "8" immediately after the initialization. The estimated remaining time display region 1504 displays the estimated remaining installation time during software installation. This region displays "initialization progresses" immediately after the initialization.

FIG. 16 is a view showing an example of the installation progress window displayed by canceling selection of software A on the software-selection window in FIG. 13 and executing the installation progress window initialization process described in FIG. 14.

The window arrangement is almost the same as in the example shown in FIG. 15. A software-explanatory-image display-region 1601, progress bar 1602, remaining software-count display-region 1603, and estimated remaining time display region 1604 exist. As a different point, the progress bar 1602 is divided into three regions 1605, 1606, and 1607. These regions correspond to the software F, component G, and software H, respectively. In this example, 40%, 20%, and 40% (100% in total) are allocated to the respective regions. Since selection of the software A is canceled on the software-selection window shown in FIG. 13, the installation amount of the software A and its components B, C, D, and E is calculated as 0. For this reason, a region of 0% is allocated to the progress bar. That is, no region is allocated.

Figure 17A:
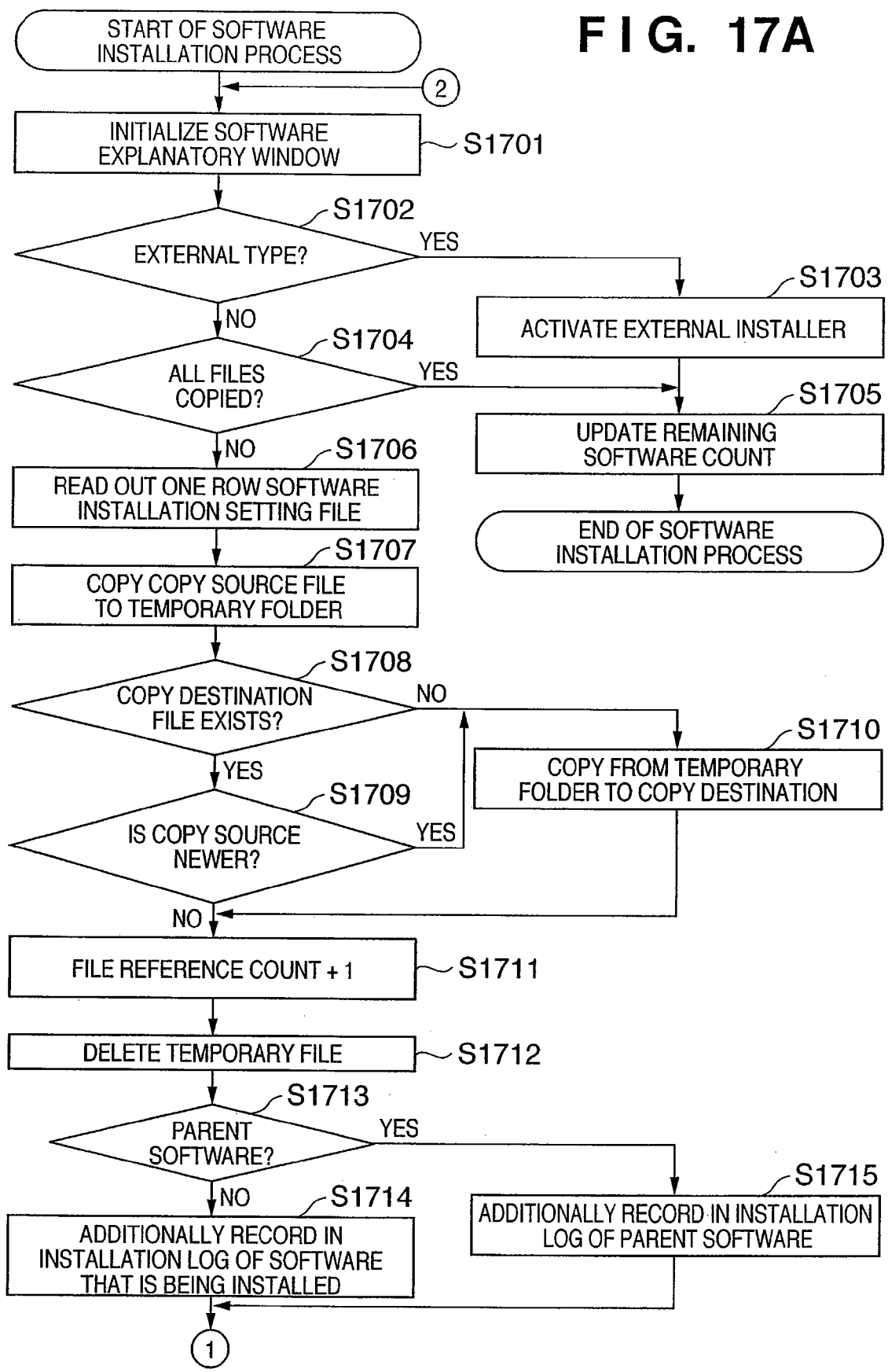
FIG. 17A is a flowchart showing details of an installation execution process in step S309.

FIGS. 17A and 17B are flowcharts showing details of the installation execution process in step S309.

In step S1701, the CPU initializes the software-explanatory-image display-region in the installation-progress window. More specifically, the CPU reads out a software-explanatory image described in the software installation-setting file and displays it in the software-explanatory-image display-region in the window.

In step S1702, the CPU determines whether the installer type described in the software installation-setting file indicates a type to activate an external installer. If it is a type to activate an external installer, the CPU activates the external software designated in the software installation-setting file in step S1703 and waits for the end of software. In step S1705, the number of remaining software programs is decremented by one. The installation process of the software is ended, and the process advances to the installation process of the next software.

If the installer type described in the software installation-setting file does not indicate a type to activate an external installer, the process advances to step S1704. In step S1704, the CPU checks whether all files in the software installation-setting file are installed. If all files are installed, the process advances to step S1705 to decrement the value in the remaining software-count display-region 1603 on the installation progress window by one and update the value. The installation process of the software is ended, and the process advances to the installation process of the next software. If all files are not installed yet, the process advances to step S1706 to read out the next file installation instruction from the software installation-setting file.

In step S1707, the CPU copies a copy source file described in the readout file installation instruction from the software-configuration file on the optical disk 106 or 107 to a temporary work folder on the hard disk 104.

In step S1708, the CPU checks the presence of a copy destination file described in the readout file installation instruction. If no copy destination file exists, the copy source file copied to the temporary work folder is copied to the copy destination file, and the process advances to step S1711.

If a copy destination file exists, the copy source file copied to the temporary work folder is compared with the existing copy destination file in step S1709. If the copy source file is newer, the copy source file copied to the temporary work folder is copied to the copy destination file in step S1710, and the process advances to step S1711. If the copy destination file is newer, the process advances to step S1711 without copying the file.

In step S1711, the copy destination file reference count in the file reference count database held by the operating system is incremented by one.

In step S1712, the copy source file copied to the temporary work folder in step S1707 is deleted.

In step S1713, the CPU checks whether the software that is being installed has a parent in the software list. If the software has no parent, the CPU issues an instruction to the operating system in step S1714 to additionally record, in the installation log of the software that is being installed, that the copy destination file is installed. Then, the process advances to step S1716.

If the software has a parent, the CPU issues an instruction to the operating system in step S1715 to additionally record, in the installation log of the parent software, that the copy destination file is installed. Then, the process advances to step S1716.

In step S1716, the CPU checks whether the readout file installation instruction contains a description of the file installation amount. If the file installation amount is described, the CPU acquires the file installation amount in step S1719. In step S1721, the CPU obtains the sum of the installation amounts of all files contained in the software and uses it for calculation in step S1723 as the installation amount of the software.

If the CPU determines in step S1716 that the readout file installation instruction contains no description of the file installation amount, the process advances to step S1717.

In step S1717, the CPU confirms whether the file installation unit described in the software installation-setting file is a file size. If it is a file size, processing is executed by using the file size as the installation amount even when the software installation-setting file contains no file installation amount. More specifically, in step S1718, the file size is acquired as the file installation amount. In step S1721, the sum of the installation amounts of all files contained in the software is obtained. The sum is used for calculation in step S1723 as the installation amount of the software.

If the CPU determines in step S1717 that the file installation unit described in the software installation-setting file is not a file size, the process advances to step S1720. In step S1720, the file installation amount is set to 1. The number of files contained in the software is defined as the installation amount of the software in step S11722 and used for calculation in step S1723.

In step S1723, the CPU calculates the progress amount of the progress bar upon copying the file. More specifically, the ratio of (file installation amount/software installation amount) calculated in the above-described steps to a region corresponding to the software, which is divided on the installation progress window initialization process in FIG. 14, is calculated.

In step S1724, the progress bar is advanced by the amount calculated in step S1723.

When the process in step S1724 is ended, the CPU checks in step S1725 whether the current position of the progress bar indicates an amount less than 5% of the whole region. If the amount is less than 5%, "calculation progresses" is displayed in the estimated remaining time display region of the installation progress window in step S1727, and the process returns to step S1704.

If the amount is equal to or more than 5%, the estimated remaining time is displayed in the estimated remaining time display region of the installation progress window in step S1726. More specifically, an elapse time T after the start of installation is obtained on the basis of the current time and the time of the installation progress window initialization process. On the basis of a current ratio P % of the progress bar, T×(100−P)/P is displayed as the estimated remaining time. Then, the process returns to step S1704.

The progress of the progress bar during installation according to the process shown in FIGS. 17A and 17B will be described below by using an example of installation of the software A after all software programs are selected on the software selection dialogue.

The software installation-setting file 210 of the software A has been described with reference to FIG. 9.

As shown in FIG. 12, the software A is the first item in the software list. Before the start of the installation process of the software A, the installation progress window has the state shown in FIG. 15. First, the process of a file MainExecFile.exe described at the top of the file section 906 in FIG. 9 starts.

After the file copy process up to step S1714 finishes, the process advances to step S1716. The software installation-setting file 210 contains a description of the installation amount of the file MainExecFile.exe. For this reason, the installation amount (4) of the file is acquired in step S1719.

Figure 18:
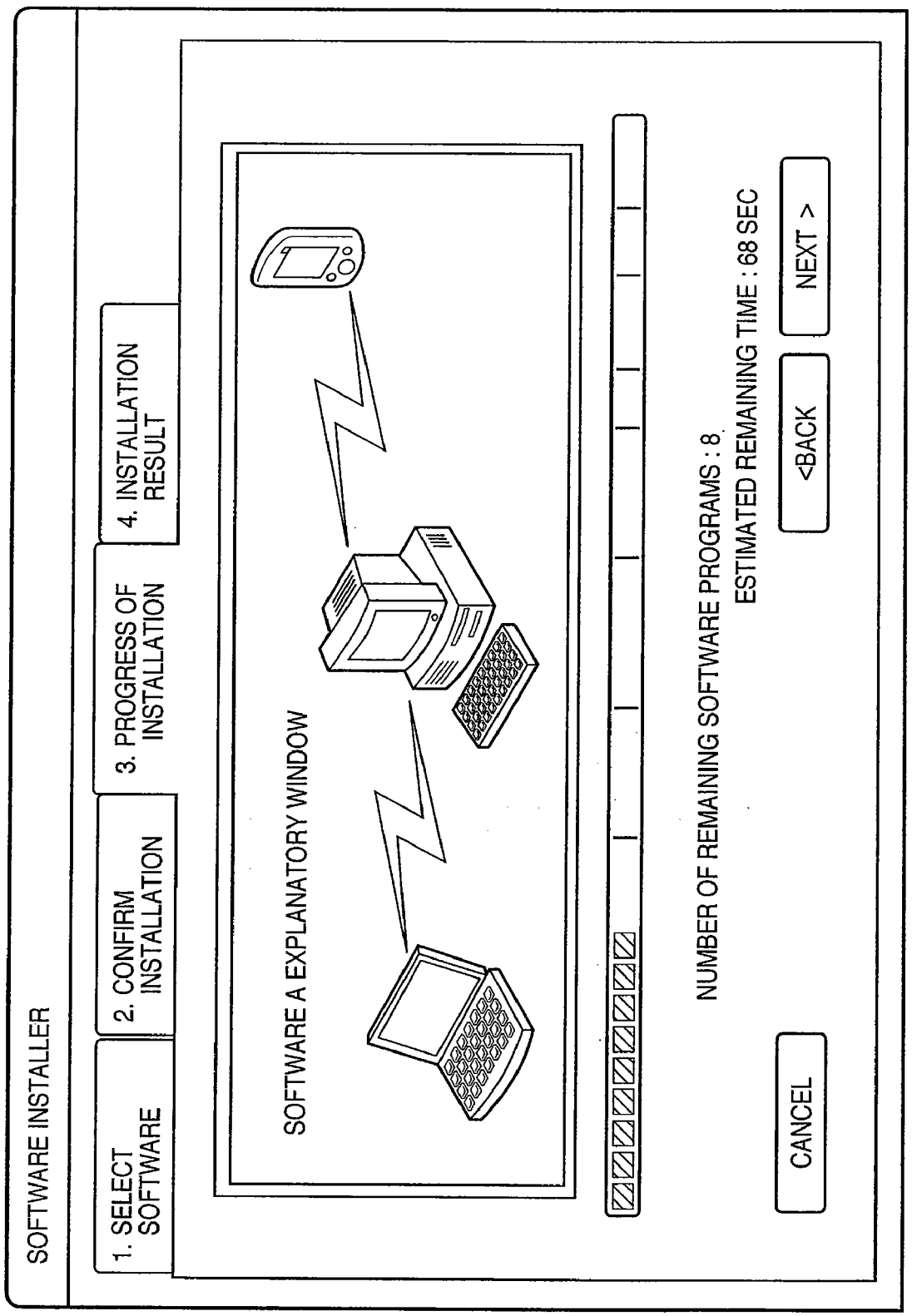
FIG. 18 is a view showing an installation progress window during installation of the software A according to the process in FIGS. 17A and 17B.

In step S1721, the sum (4+1=5) of the installation amounts of all files contained in the software is obtained. In step S1723, the progress amount upon copying the file MainExecFile.exe is calculated. In this embodiment, the progress bar region allocated to the software A is 40%, as shown in FIG. 15. The progress bar advances at a ratio of (file installation amount/software installation amount), i.e., 4/5=0.8. In step S1724, the progress bar advances by 40%×0.8=32%. If file copy until this point of time requires T=32 sec, 32×(100−32)/32=68 sec is displayed in the estimated remaining time display region of the installation progress window as the estimated remaining time in step S1726. FIG. 18 shows display on the installation progress window at this time.

The process of the component D will also be described.

The software installation-setting file 216 of the component D has been described with reference to FIG. 10.

Figure 19:
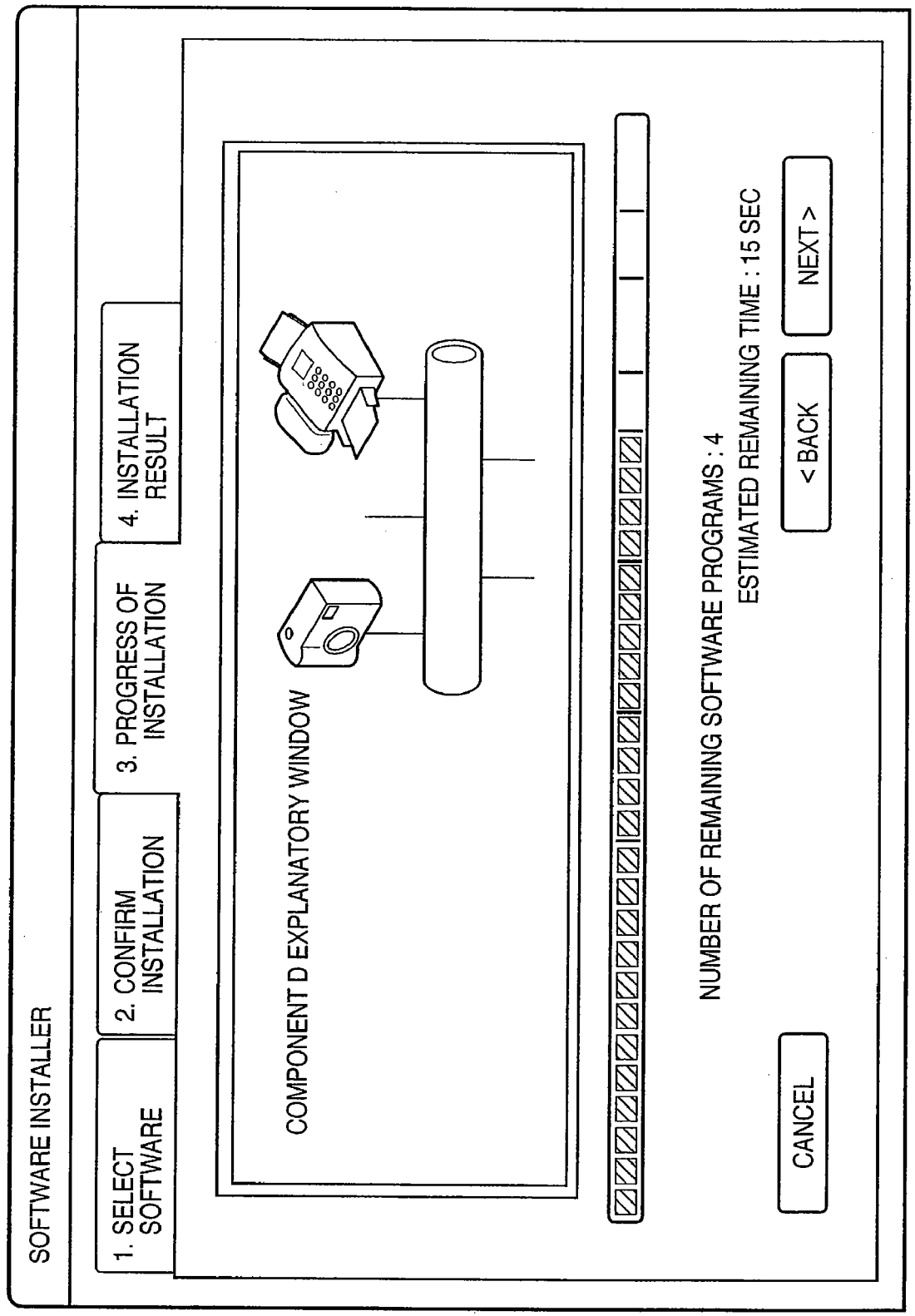
FIG. 19 is a view showing an installation progress window displayed when installation of a component D starts in step S1701.

FIG. 19 shows a window displayed when installation of the component D starts in step S1701. As shown in FIG. 12, the component D is the fifth item in the software list. Hence, the progress bar indicates 68% after the first to fourth software are installed.

Figure 20:
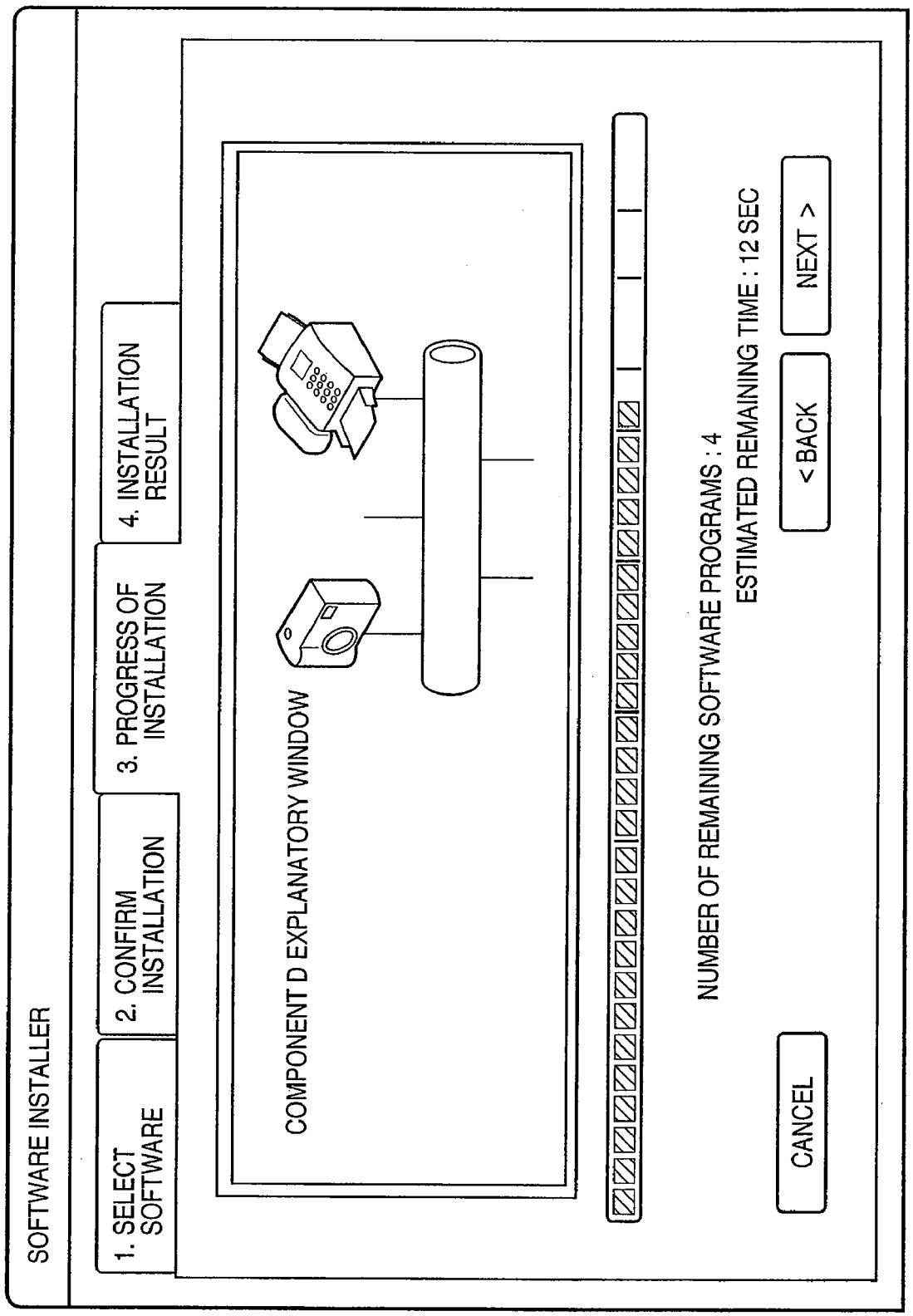
FIG. 20 is a view showing an installation progress window during installation of the component D according to the process in FIGS. 17A and 17B.
Figure 24:
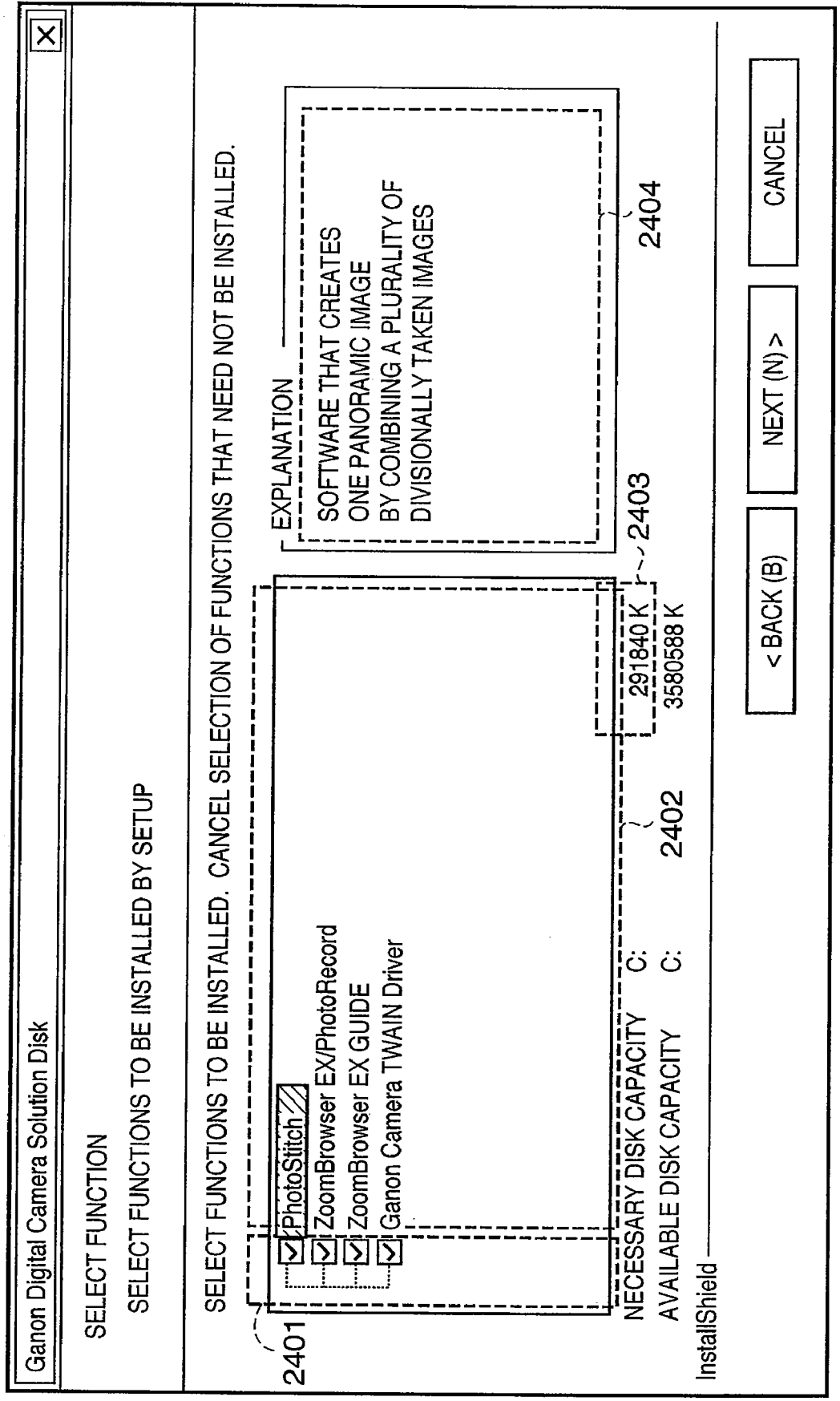
FIG. 24 is a view showing a software selection window of conventional software.

First, the process of a file ComponentDMain.dll described at the top of the file section 1006 in FIG. 10 starts. After the file copy process up to step S1714 finishes, the process advances to step S1716. In the software installation-setting file 216, the installation amount of the file ComponentDMain.dll is 0. That is, there is no description of the installation amount. Hence, the process advances to step S1717. Since the file installation unit is a file size, the file size of the file ComponentDMain.dll is acquired in step S1718. In step S1721, the file sizes of all files described in the optical disk 106 are acquired and totalized to obtain the software-installation amount. In step S1723, the progress amount upon copying the file ComponentDMain.dll is calculated. Assume that the size of the file ComponentDMain.dll is 20 MB, and the size of the CompShare.lib is 10 MB. In this embodiment, the progress bar region allocated to the component D is 12%, as shown in FIG. 15. The progress bar advances at a ratio of (file installation amount/software-installation amount), i.e., 20/30=0.67. In step S1724, the progress bar advances by 12%×0.67=8% and indicates 76%. If file copy until this point of time requires T=38 sec, 38×(100−76)/76=12 sec is displayed in the estimated remaining time display region of the installation progress window as the estimated remaining time in step S1726. FIG. 20 shows display on the installation progress window at this time.

Blinking a progress bar region corresponding to a component that is being installed or changing the color of the region to explicitly indicate "progress", or assigning different colors to the progress bar regions of the components can effectively make the user recognize the display.

FIG. 21 is a view showing the internal structure of a file reference count database that is held in the operating system and used for the installation process.

Each record of the database has a file name field 2101 and a reference count field 2102 corresponding to the file name. When the installer requests to increment the reference count of a file that already has a record, the value of the reference count field is incremented by one. If the installer requests to increment the reference count of a file that has no record, a record is newly created, and the value of the reference count field is incremented by one. If the installer requests to decrement the reference count of a file, the record of the file is decremented.

If the reference count field is 0 or less as a result of decrement, the record is automatically deleted.

In this embodiment, the reference count database is implemented by using the function of the operating system. However, the same effect as described above can be obtained by calculating the reference count by another means. The reference count is a mechanism that is introduced to prevent erroneous uninstallation of a file shared by a plurality of software programs. The present invention is not limited to use of the reference count if the same effect is available.

FIG. 22 is a view showing part of an installation log created by the installation process in FIG. 14.

The installation log records which files of which software are installed by an installer, and the installation order of the files. In this embodiment, the installation log is a text file. The text file is divided into sections for software and describes installed files in chronological order. For example, a section 2201 in FIG. 22 records a list of files used to install the software A and another software having the software A as a parent. Similarly, a section 2202 records a list of files used to install the software F and another software having the software F as a parent.

Each section includes a section name and a file list. For example, the section 2201 includes a title 2203 and a file list 2204. The file list 2204 records a list of files used to install the software A and another software having the software A as a parent in the order of installation.

FIG. 23 is a flowchart showing details of an uninstallation process according to the embodiment.

In step S2301, an uninstallation process initialization process is executed. More specifically, to uninstall software, the identifier of software as an uninstallation target is given to a program to execute uninstallation, i.e., an uninstaller. The identifier is acquired in step S2301.

In step S2302, a message to make the user check whether to execute uninstallation is displayed to ask the user to input. If the user inputs cancel, the uninstallation process is ended without executing anything. If the user inputs OK, the process advances to step S2303 to start the uninstallation process.

In step S2303, the CPU acquires the latest item of the installation log of the software as the uninstallation target. In step S2304, the CPU determines whether the installation log of the software is acquired. If no log is acquired, i.e., if the installation log of the software is blank, the process advances to step S2310. If the installation log is acquired, the CPU inquires the reference count database about the target file reference count in step S2305.

In step S2306, the CPU confirms whether the returned value is 1. If the value is 1, the target file is deleted in step S2307, and the process advances to step S2308. If the value returned from the reference count database is larger than 1, the process advances to step S2308 without deleting the file.

In step S2308, the reference count of the target file is decremented by one. In step S2309, the processed installation log item is deleted from the installation log, and the process returns to step S2303.

In step S2310, a message indicating the end of the uninstallation process is displayed for the user. When message display finishes, the uninstallation process is ended.

Other Embodiment

The objects of the embodiment are also achieved by the following method. A storage medium (or recording medium) which records software program codes to implement the functions of the above-described embodiment is supplied to a system or apparatus. The computer (or CPU or MPU) of the system or apparatus reads out and executes the program codes stored in the storage medium. In this case, the program codes read out from the storage medium themselves implement the functions of the above-described embodiment. The storage medium that stores the program codes constitutes the present invention. The functions of the above-described embodiment are implemented not only by causing the computer to execute the readout program codes. The present invention also incorporates the following arrangement. The operating system (OS) running on the computer wholly or partially executes actual processing on the basis of the instructions of the program codes, thereby implementing the functions of the above-described embodiment.

The present invention also incorporates the following arrangement. The program codes read out from the storage medium are written in the memory of a function expansion card inserted to the computer or a function expansion unit connected to the computer. The CPU of the function expansion card or function expansion unit wholly or partially executes actual processing on the basis of the instructions of the program codes, thereby implementing the functions of the above-described embodiment.

The storage medium to which the present invention is applied stores program codes corresponding to the above-described procedures.

As another characteristic feature of the present invention, the storage medium can be the optical disk 106 or 107 shown in FIG. 1A or a card-shaped storage medium capable of exchange or distribution.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-032919, filed Feb. 9, 2006, and Japanese Patent Application No. 2006-032920, filed Feb. 9, 2006, which are hereby incorporated by reference herein in their entirety.

What is claimed is:

1. An install apparatus for installing a plurality of programs recorded in an external recording medium, comprising:
a reading unit configured to read installation-setting files of the plurality of programs from the external recording medium in accordance with one installation executable file, wherein the external recording medium stores the one installation executable file and stores, for each program, an installation-setting file and an installation target file in correspondence with each other;
a determination unit configured to determine an order for processing the plurality of programs in accordance with a sort key of the installation-setting file which is read out;
a judgment unit configured to judge whether a program corresponding to the installation-setting file is parent or not by comparing the sort keys of the installation setting files with each other according to the determined order;
a selection unit configured to select installation target program from the programs judged as parent; and
an installation unit configured to install the installation target programs in order by reading an installation instruction of next installation target program in accordance with the installation-setting file corresponding to the selected program.

2. An apparatus according to claim 1, further comprising:
an acquisition unit configured to acquire the number of installation target files of each program and a file size of each installation target file in accordance with the installation-setting files read out by said reading unit;
a calculation unit configured to calculate a sum of the file sizes of the installation target files acquired by said acquisition unit;
a determination unit configured to determine an installation progress amount of each program on the basis of the number of files of the installation target files acquired by said acquisition unit and the sum calculated by said calculation unit; and
an update unit configured to update a state of progress of installation on the basis of the installation progress amount determined by said determination unit every time said installation unit installs the installation target file.

3. An apparatus according to claim 2, further comprising a notification unit arranged to notify a user of the state of progress of installation updated by said update unit.

4. A method of installing a plurality of programs recorded in an external recording medium, comprising:
a reading step of reading out installation-setting files of the plurality of programs from the external recording medium in accordance with one installation executable file, wherein the external recording medium stores the one installation executable file and stores, for each program, an installation-setting file and an installation target file in correspondence with each other;
a determination step of determining an order for processing the plurality of programs in accordance with a sort key of the installation-setting file which is read out;
a judgment step of judging whether a program corresponding to the installation-setting file is parent or not by comparing the sort keys of the installation setting files with each other according to the determined order;
a selection step of selecting installation target program from the programs judged as parent; and
an installation step of installing the installation target programs in order by reading an installation instruction of next installation target program in accordance with the installation-setting file corresponding to the selected program.

5. A non-transitory storage medium storing a program that causes a computer to execute a method of installing a plurality of programs recorded in an external recording medium, the program comprising:
a code of a reading step of reading out installation-setting files of the plurality of programs from the external recording medium in accordance with one installation executable file, wherein the external recording medium stores the one installation executable file and stores, for each program, an installation-setting file and an installation target file in correspondence with each other;

a code of a determination step of determining an order for processing the plurality of programs in accordance with a sort key of the installation-setting file which is read out;

a code of a judgment step of judging whether a program corresponding to the installation-setting file is parent or not by comparing the sort keys of the installation setting files with each other according to the determined order;

a code of a selection step of selecting installation target program from the programs judged as parent; and a code of an installation step of installing the installation target programs in order by reading an installation instruction of next installation target program in accordance with the installation-setting file corresponding to the selected program.

* * * * *